US012806776B2

(12) United States Patent
Søe-Knudsen

(10) Patent No.: US 12,806,776 B2
(45) Date of Patent: Nov. 24, 2026

(54) METHOD FOR CONFIGURING A ROBOT SYSTEM

(71) Applicant: Universal Robots A/S, Odense S (DK)

(72) Inventor: Rune Søe-Knudsen, Arslev (DK)

(73) Assignee: Universal Robots A/S, Odense S (DK)

( * ) Notice: Subject to any disclaimer, the term of this patent is extended or adjusted under 35 U.S.C. 154(b) by 0 days.

(21) Appl. No.: 18/844,656

(22) PCT Filed: Mar. 6, 2023

(86) PCT No.: PCT/DK2023/050036

§ 371 (c)(1),
(2) Date: Sep. 6, 2024

(87) PCT Pub. No.: WO2023/169638

PCT Pub. Date: Sep. 14, 2023

(65) Prior Publication Data

US 2025/0187188 A1 Jun. 12, 2025

(30) Foreign Application Priority Data

Mar. 8, 2022 (DK) ............................ PA202270090

(51) Int. Cl.
*B25J 9/16* (2006.01)

(52) U.S. Cl.
CPC .................................. *B25J 9/1664* (2013.01)

(58) Field of Classification Search
CPC ...... B25J 9/1664; B25J 9/1674; B25J 9/1679; B25J 9/1692; B25J 9/0093; B25J 9/1697; G05B 2219/40602; G05B 19/41815
See application file for complete search history.

(56) References Cited

U.S. PATENT DOCUMENTS 4,763,531 A 8/1988 Dietrich et al.
10,399,232 B2 9/2019 Oestergaard et al.
(Continued)

FOREIGN PATENT DOCUMENTS

CN 108213988 A 6/2018
CN 109922949 A 6/2019
(Continued)

OTHER PUBLICATIONS

International Search Report and Written Opinion mailed Jun. 12, 2023, for related International Application No. PCT/DK2023/050036 (11 pages).
(Continued)

*Primary Examiner* — Dylan M Katz
(74) *Attorney, Agent, or Firm* — ARENTFOX SCHIFF LLP

(57) ABSTRACT

The invention relates to a method for configuring a robot system, wherein said robot system comprises a robot arm and a robot controller configured to control operation of said robot arm. The method comprises the steps of: communicatively connecting each of at least one peripheral device to a respective peripheral port of a plurality of peripheral ports of said robot system: interactively engaging said at least one peripheral device to establish a test sequence of device states based on inputs of said at least one peripheral device to said plurality of peripheral ports: monitoring said inputs of said at least one peripheral device to said plurality of peripheral ports to identify one or more input-receiving peripheral ports of said plurality of peripheral ports; and configuring a robot system control process of said robot system based on said device states of said test sequence and based on said one or more input-receiving peripheral ports. The invention further relates to a robot system.

29 Claims, 6 Drawing Sheets

(56) References Cited

U.S. PATENT DOCUMENTS

Figure 1:
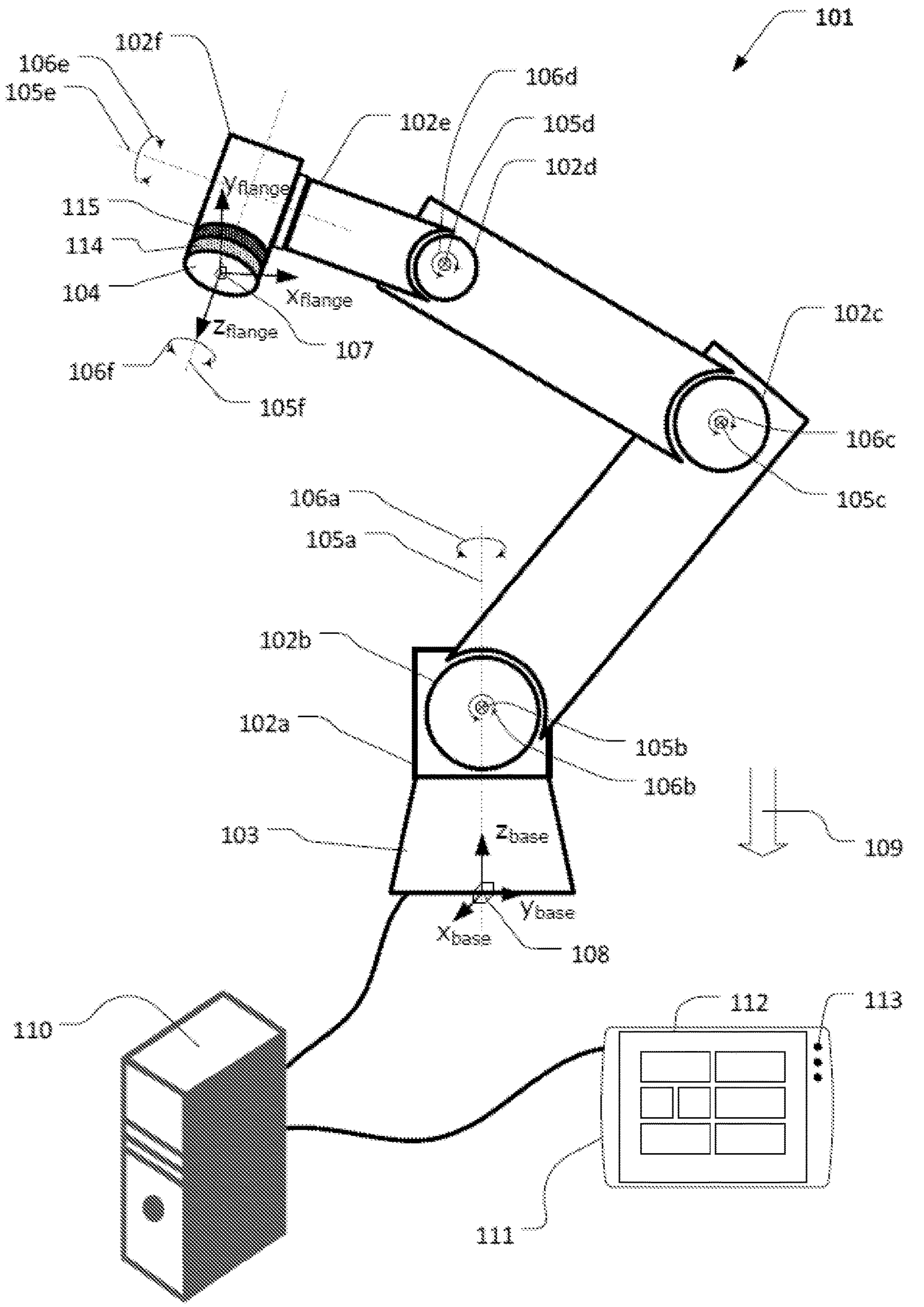

| | | | |
|---|---|---|---|
| D895,704 S | 9/2020 | Johansen | |
| D895,705 S | 9/2020 | Johansen | |
| D895,706 S | 9/2020 | Johansen | |
| D898,090 S | 10/2020 | Johansen | |
| 10,850,393 B2 | 12/2020 | Oestergaard et al. | |
| D915,487 S | 4/2021 | Sell | |
| D924,228 S | 7/2021 | Mirth | |
| D932,485 S | 10/2021 | Mirth | |
| D932,486 S | 10/2021 | Mirth | |
| D932,487 S | 10/2021 | Mirth | |
| 11,260,543 B2 | 3/2022 | Johansen | |
| 11,474,510 B2 | 10/2022 | Oestergaard et al. | |
| 11,796,045 B2 | 10/2023 | Johansen | |
| 11,839,979 B2 | 12/2023 | Rosenlund et al. | |
| 11,964,389 B2 | 4/2024 | Johansen | |
| 12,011,824 B2 | 6/2024 | Vraa et al. | |
| 2010/0211220 A1 | 8/2010 | Nishi et al. | |
| 2013/0079928 A1 | 3/2013 | Soee-Knudsen et al. | |
| 2013/0231778 A1 | 9/2013 | østergaard | |
| 2013/0255426 A1 | 10/2013 | Kassow et al. | |
| 2015/0204742 A1 | 7/2015 | Draisey | |
| 2020/0171658 A1 | 6/2020 | Kielsholm Thomsen | |
| 2021/0086374 A1 | 3/2021 | Brandt et al. | |
| 2021/0129340 A1* | 5/2021 | Babikian | B25J 15/00 |
| 2021/0260757 A1 | 8/2021 | Nielsen et al. | |
| 2021/0260759 A1 | 8/2021 | Knudsen et al. | |
| 2022/0063090 A1 | 3/2022 | Seki | |
| 2022/0161433 A1 | 5/2022 | Beck et al. | |
| 2022/0184810 A1 | 6/2022 | Beck et al. | |
| 2022/0226993 A1 | 7/2022 | Madsen | |
| 2022/0379463 A1 | 12/2022 | Hansen | |
| 2022/0379468 A1 | 12/2022 | Hansen | |
| 2022/0388156 A1 | 12/2022 | Hansen | |
| 2023/0028405 A1* | 1/2023 | Malzahn | B25J 9/161 |
| 2023/0035296 A1 | 2/2023 | Søe-Knudsen et al. | |
| 2023/0052996 A1 | 2/2023 | Thomsen | |
| 2023/0191603 A1 | 6/2023 | Thomsen et al. | |
| 2023/0405819 A1 | 12/2023 | Kravchenko et al. | |
| 2023/0405822 A1 | 12/2023 | Kravchenko et al. | |
| 2023/0418258 A1 | 12/2023 | Mirth | |
| 2024/0351209 A1 | 10/2024 | Graabaek et al. | |

FOREIGN PATENT DOCUMENTS

| | | |
|---|---|---|
| DK | 202270090 A1 | 1/2024 |
| EP | 1435550 A1 | 7/2004 |
| EP | 3831553 A1 | 6/2021 |
| WO | 2014/110682 A1 | 7/2014 |

OTHER PUBLICATIONS

Tanya M. Anandan: "Control Engineering Plug-and-play robot ecosystems on the rise", Dec. 27, 2021 (Dec. 27, 2021), pp. 1-18, XP93050003, URL:https://web.archive.org/web/20211227100024l/https: controleng.com/articles/plug-and-play-robot-ecosystems-on-the-rise/.

Search Report and Written Opinion received for Danish Patent Application No. PA 202270090, mailed on Sep. 20, 2022, 8 pages.

Search Report received for Danish Patent Application No. PA 202270090, mailed on Mar. 20, 2023, 3 pages.

Universal Robots., "User Manual UR3/CB3", Version 3.1, 2009, 181 pages.

Jiang et al., "Inferring and monitoring invariants in robotic systems," Autonomous Robots, Kluwer Academic Publishers, Dordrecht, NL, vol. 41, No. 4, 2016, 1027-1046.

* cited by examiner

METHOD FOR CONFIGURING A ROBOT SYSTEM

This application is a U.S. national stage entry of PCT application no. PCT/DK2023/050036 which was filed on Mar. 6, 2023. PCT application no. PCT/DK2023/050036 claims priority to Denmark application no. PA202270090 which was filed on Mar. 8, 2022. This application claims priority to both PCT application no. PCT/DK2023/050036 and to Denmark application no. PA202270090. Both PCT application no. PCT/DK2023/050036 and Denmark application no. PA202270090 are incorporated into this this application by reference.

FIELD OF THE INVENTION

The present invention relates to a method for configuring a robot system. The invention further relates to a robot system.

BACKGROUND OF THE INVENTION

Robot arms comprising a plurality of robot joints and links where motors can move part of the robot arm in relation to each other are known in the field of robotics. Typically, the robot arm comprises a robot base which serves as a mounting base for the robot arm; and a robot tool flange where to various tools can be attached. A robot controller is configured to control the robot joints in order to move the robot tool flange in relation to the base. For instance, in order to instruct the robot arm to carry out a number of working instructions. The robot joints may be rotational robot joints configured to rotate parts of the robot arm in relation to each other, prismatic joints configured to translate parts of the robot arm in relation to each other and/or any other kind of robot joints configured to move parts of the robot arm in relation to each other. The robot arms may be provided with robot joints connected in series, in parallel or as a combination thereof and some robot joints may be connected directly with other joints or separated by a connecting member. The robot arms may comprise a plurality of arm sections and a plurality of tool flanges.

Typically, the robot controller is configured to control the robot joints based on a dynamic model of the robot arm, where the dynamic model defines a relationship between the forces acting on the robot arm and the resulting accelerations of the robot arm. Often, the dynamic model comprises a kinematic model of the robot arm, knowledge about inertia of the robot arm and other parameters influencing the movements of the robot arm. The kinematic model defines a relationship between the different parts of the robot arm and may comprise information of the robot arm such as, length, size of the joints and links and can for instance be described by Denavit-Hartenberg parameters or like. The dynamic model makes it possible for the controller to determine which torques the joint motors shall provide in order to move the robot joints for instance at specified velocity, acceleration or in order to hold the robot arm in a static posture.

Typically, it is possible to attach various end effectors to the robot tool flange or other parts of the robot arm, such as grippers, vacuum grippers, magnetic grippers, screwing machines, welding equipment, dispensing systems, visual systems etc.

A robot system can comprise of one or more robot arms, and the robot system and/or robot arm control process is programmed by a user, a robot integrator or a like, which defines various instructions for the robot arm, such as predefined moving patterns and working instructions such as gripping, waiting, releasing, screwing instructions. The instruction can be based on various sensors or input signals which typically provide a triggering signal used to stop or start a given instruction. The triggering signals can be provided by various indicators, such as safety curtains, vision systems, position indicators, sensor readings, analogue and digital inputs, signals from peripheral devices, stream of signals etc.

It is known, for example from US 2022/0063090 A1, that robots may be controlled on the basis of input signals.

Installing or reconfiguring a robot system which involves interactions with peripheral devices can be a complicated and time-consuming task. Robot systems without peripheral devices can already be difficult to handle. The inclusion of additional devices adds additional cables and connections, and each of such additional peripheral devices may have unique functionalities which have to be understood and integrated with the robot system.

Moreover, reconfiguration, optimization, and troubleshooting can be difficult in such systems, since it is not straightforward how the peripheral devices interact and engage with their surroundings.

SUMMARY OF THE INVENTION

The inventors have identified the above-mentioned problems and challenges related to peripheral devices and their interaction in robot systems, and subsequently made the below-described invention which may improve integration of peripheral devices in robot systems.

An aspect of the invention relates to a method for configuring a robot system, wherein the robot system comprises a robot arm and a robot controller configured to control operation of the robot arm, wherein the method comprises the steps of:

- communicatively connecting each of at least one peripheral device to a respective peripheral port of a plurality of peripheral ports of the robot system;
- interactively engaging the at least one peripheral device to establish a test sequence of device states based on inputs of the at least one peripheral device to the plurality of peripheral ports;
- monitoring the inputs of the at least one peripheral device to the plurality of peripheral ports to identify one or more input-receiving peripheral ports of the plurality of peripheral ports; and
- configuring a robot system control process of the robot system based on the device states of the test sequence and based on the one or more input-receiving peripheral ports.

In conventional robot systems, programming and integration of peripheral devices can be a cumbersome and time-consuming process, especially for non-professionals. In general, the invention may solve a number of problems relating to integration of peripheral devices and programming of robot systems comprising peripheral devices, which may smoothen the burden of such task for both professionals and non-professionals.

In an exemplary embodiment, a peripheral device is a proximity sensor connected to a peripheral port of the plurality of peripheral ports. While programming the robot system, the user moves his hand to temporarily activate the sensor and, accordingly, a test sequence of logic signals is established via input from the sensor to the peripheral port to which it is connected, where the test sequence of logic signals indicates the device state of the sensor. The test sequence is displayed in the programming interface which is used to program the robot. In this example, the logic signals of the test sequence are low, then high, then low, indicating the temporary activation of the sensor, surrounded by periods of no activation. The device states are then directly used in programming of the robot system control process, which is the control program used to operate the robot during normal operation. Namely, in this example, the established high signal is integrated in the robot system control process as a condition for operation of the robot arm of the robot system. Resultingly, the robot system is programmed to initiate a particular operation of the robot arm upon detection, e.g. of a workpiece, via the proximity sensor.

The invention thus enables configuration of the robot control process based on device states of peripheral devices via demonstration, thereby potentially lessening the task of programming a robot system. In particular, the programming threshold for people with limited experience with robots is lowered, which is advantageous.

By establishing a test sequence of device states by interactively engaging with peripheral devices, the link between any peripheral devices, the peripheral ports, and their representations in a programming environment may be established easily and their relation may be clarified for the user, which is advantageous. Such links and relations are otherwise particularly time-consuming to establish or identify in typical robot systems, in which many peripheral ports exist, e.g. as an integrated part of the robot controller.

Furthermore, the invention may permit rapid testing of whether peripheral devices function as intended during programming of the robot system, for example whether peripheral devices establish signals as expected, which is advantageous.

In addition, by basing the robot system control process on interactively engaging with any peripheral devices, the risk of choosing an incorrect device state of a peripheral device as a condition in the robot system control process may be advantageously reduced. For instance, in a robot system where a plurality of peripheral devices is connected to respective peripheral ports and each provide a logic signal to the peripheral ports; the present invention makes is easier for the user to identify the peripheral ports and signals that, in a particular situation, should be used in the robot system control logic.

Similarly, the risk of choosing an incorrect peripheral port of the plurality of peripheral ports may be reduced, which is advantageous.

The invention is beneficial in robot systems in which several peripheral devices are used. Such systems are more susceptible to poor cable management between peripheral devices and the plurality of peripheral ports. Here, the invention may advantageously reduce the risk of erroneously mistaking two peripheral devices or their associated peripheral ports from each other, since the interactive engagement with the peripheral devices may be used to identify the individual devices and their relation to the rest of the robot system. Thus, the invention may even reduce the need for cable management altogether, which is advantageous. Particularly for collaborative robot systems which can sometimes by subject to relatively regular reconfigurations.

Moreover, the establishment of a test sequence of device states, which are typically displayed or visualized for the user, may quickly present an overview of the robot system and its interactions to a human operator, which is advantageous.

A robot arm may be understood as a type of automated and controllable mechanical arm. It may typically have a number of robot joints and links where motors can move a part of the arm in relation to another part. One end of the arm is typically connected to a robot base, whereas another end of the arm is connected to a robot tool flange configured to receive a robot tool which the robot arm can use during operation.

A robot arm is typically controlled by a robot controller. Namely, the robot controller will typically be configured to control the motors of the robot arm to move the robot tool flange relatively to the robot base. During normal operation, the robot controller may for example be programmed to control the robot arm according to a number of predefined trajectories to perform a particular task. Particularly, this task may then be performed in a repetitive manner by the robot arm and the robot controller in collaboration. Note that even though robot systems are typically well suited to perform repetitive, monotonous tasks, robot systems according to the invention are not restricted to a particular type of task.

A robot system control process may be understood as the programmed instructions upon which the robot controller controls the robot arm during operation of the robot system. Alternatively, a robot system control process may be referred to as a robot system control program, a robot system control procedure, or a robot task. Thus, the robot system control process may be programmable/configurable by the user via a user interface associated with the robot system, and the control process may further be implemented and/or executed on the robot controller. An example of a robot task may be the task of moving an object, such as moving an object from one conveyor belt to another conveyor belt. The robot arm asserts an idle position while waiting for the object to arrive on a first conveyor belt. As the object arrives at a specific position it engages a peripheral device, such as a sensor (e.g., a proximity sensor), and once engaged, the robot arm is activated whereby the robot arm picks up and moves the object from the first conveyor belt to a second conveyor belt where the robot arm places the object. This is just an example of a robot task and is in no way limiting to the term robot task (or robot system control process) used throughout the present disclosure, as a skilled person readily recognizes that robot arms may be utilized in multiple applications and that multiple robot tasks may be carried out by a robot arm.

A robot system may further involve one or more peripheral devices. A peripheral device may be understood as a device which is external from the robot arm and the robot controller which communicates with the robot controller and/or robot arm during operation to add additional functionality to the robot system. A peripheral device may sometimes facilitate some kind of communication between the robot system and its surroundings. Examples of peripheral devices comprise cameras and sensors such as pressure sensors, proximity sensors, temperature sensors, distance sensors, conveyors, external servo axis, sensor mats, light curtains, PLC devices, external machinery such as lathes, CNC machines, pressing machines, pinching machines injection moulding machines, labelling machines, printing machine etc.

However, note that the invention is not limited to any particular peripheral devices.

A peripheral device typically communicates with the remaining robot system, for instance the robot controller, through a communicative connection via a peripheral port. A peripheral port may thus be understood as an interface between a peripheral device and the remaining robot system. Typically, a robot controller has a plurality of peripheral ports which each is configured for connecting a peripheral device, e.g. via a cable. However, the invention is not limited to peripheral ports which are integrated in the robot controller and, further, the invention is not limited to peripheral ports which are connected via wires/cables. A peripheral device may for example be communicatively connected to a wireless peripheral port. And the plurality of peripheral ports may be communicatively connected to the robot controller. In typical applications, the number of available peripheral ports of a robot system is greater than the actual number of peripheral devices which are connected. Thus, a peripheral port is not necessarily connected to a peripheral device, although a peripheral device being part of a robot system, is, typically, at least at some point, connected to a peripheral port. The peripheral port(s) can be provided as ports at the robot controller, as ports at the robot arm such as at the robot tool joint or at the tool flange. The peripheral port can also be provided as a part of a peripheral port hub forming part of the robot system and which is communicative connected to the remaining robot system, for instance the robot controller. The peripheral port hub can comprise one or more peripheral ports and be configured to transmit communication from the peripheral device(s) to the remaining robot system, for instance the robot controller. The peripheral port hub can be configured to transmit the communication from the peripheral device(s) directly from the peripheral devices to the remaining robot system as received, however it is noted that the peripheral port hub also can be configured to process the communication from the peripheral devices before transmitting a processed communication to the remaining robot system. For instance, the peripheral port hub can be configured to filter signals received from the peripheral devise(s), extract device states of the peripheral devices from the signals from signals received from the peripheral devise(s) and thereafter transmit the device states to the remaining robot system.

Interactively engaging a peripheral device may be understood as affecting or engaging with the peripheral device to change a device state of that peripheral device. Consequently, an output of that peripheral device changes in response to the interactively engagement of that peripheral device. In a simple example, a peripheral device is a force sensor configured to detect whether it is affected by a force larger than a force threshold. That peripheral device may be interactively engaged by affecting it with a force, such as a force larger than the force threshold. Typically, within the scope of the invention, peripheral devices are interactively engaged at least partially manually, for instance in connection with manually configuration of a robot system. However, the invention is not limited to such examples, and peripheral devices may also be interactively engaged by partially and fully automated means, devices, or equipment. Examples of such automated interactive engagements include an automated conveyer belt which interactively engages with a position sensor when the belt has moved to a particular position, a sensor which is affected by the robot arm itself, an auxiliary robot (such as auxiliary robot arm or an auxiliary autonomous mobile robot) engaging with a peripheral device of the robot system and/or devices of the robot system itself may also interactively engaging a peripheral device. For instance, the robot controller can send an engaging signal to a peripheral device which in response changes it's device state and where an output of that peripheral device changes in response to the change in its device state. Interactively engaging a peripheral device may alternatively be understood as engaging, interactively activating, activating, interactively affecting, or affecting a peripheral device. The engagement may be referred to interactive in that it is typically part of or a result of a manual action which affect the peripheral device in accordance with its functionality, for example affect a sensed value of a peripheral device which is a sensor. Further, the terminology of interactively engaging should be interpreted in view of the scope of the invention which relate to a method for configuring a robot system, for example programming or reprogramming a robot system.

In addition, peripheral devices according to the invention comprises input/output peripheral devices which are, e.g., both capable of providing an input to the robot controller as well as capable of receiving an output from the robot controller.

A device state may be understood as any state of any device of the robot system, for instance a state of a peripheral device. A device state may for instance indicate an operation states of processing devices and sensor states of sensor devices. Processing devices may be any devices capable of performing an operation, a task, an action or processing workpieces or data, where the device states for instance can be "ready" indicating that the processing device is ready to perform its operation, task or action, "processing" indicating that the processing device is performing its operation, task or action, "done" indicating that the processing device has done its operation, task or action. Operation states of processing devices can also be logic states provided as a Boolean indicating on/off, true/false, high/low, open/close parameters related to the processing device or parts of the processing device. Examples of processing devices can for instance be peripheral devices such as conveyors, external servo axis, external machinery such as lathes, CNC machines, pressing machines, pinching machines injection moulding machines, labelling machines, printing machine etc. Sensor devices may be any device capable of sensing, measuring, detecting, encoding, registering etc. for instance parameters, states, conditions of elements, objects, humans, and devices near or forming part of the robot system, where the sensor states can indicate the sensed, measured, detected, encoded, registered parameters, states, conditions of elements, objects, humans and devices near or forming part of the robot system. The sensor state can for instance be provided as values indicating the size, magnitude, dimensions, proportions, weight, amount, total, quantity etc. of sensed, measured, detected, encoded, registered parameters, states and/or conditions. The sensor state can also be provided as a logic state provided as a boolean indicating on/off, true/false, high/low, above/under, etc. of a measured, detected, encoded, registered parameters, states, condition. Examples of sensor devices can for instance be peripheral devices such as cameras and sensors such as pressure sensors, proximity sensors, temperature sensors, distance sensors, sensor mats, light curtains. It is noted that the peripheral device may be provided as a combination of processing devices and sensing devices, for instance a processing device may be configured to process data sensed by a sensing device where the processing devise provided device states based on processed sensor data.

A test sequence of device states may thus for example be a sequence of device states from one or more peripheral device. Such sequences of device states may further be associated with durations in which each device states persists. The signal sequence can be independent or dependent on the timing as well.

A logic state may be understood as a value of an analogue, digital, binary signal at some point in time, such as "high"/"low" or a similar representation. A test sequence of logic states may thus for example be a sequence of logic states from a peripheral device, e.g., "low" then "high". Such sequences of logic states may further be associated with durations in which each logic state (high/low) persists. The signal sequence can be independent or dependent on the timing as well.

In embodiments of the invention, a peripheral device is interactively engaged to establish a test sequence of device states based on inputs of the peripheral device to a peripheral port. Thus, these device states are a result of the engagement with the peripheral device. And these device states may then serve as basis for configuring the robot system and the robot system control process accordingly.

A test sequence of device states may also comprise device states of several peripheral devices. The device states from each of the individual peripheral devices may, for example, be allocated in a separate sub-sequence of the test sequence, such that the test sequence comprises several sub-sequences of device states where each of the sub-sequences is based on input of an individual peripheral device of the several peripheral devices.

Thus, the test sequence of device states may generally denote a change of state of one or more peripheral devices, or it may denote a sequence of multiple changes of state of one or more peripheral devices. In its most simple form, the test sequence may comprise a single event, such as toggling of a logic state, e.g., from low to high or opposite from high to low. In more advanced forms, the test sequence may comprise multiple events relating to one or more peripheral devices, such as a plurality of peripheral devices. The state of the one or more peripheral devices may be conveyed as a signal through one or more peripheral ports via different data formats, and may be implemented fully analogue, fully digital, or any combination thereof. The representation of the device states may be represented by the test sequence in any conceivable way, including toggling of logic states ("high"/"low") and by a pulsed signal. A skilled person will readily appreciate that the way that the signal is represented may depend on the specific peripheral device(s) being used in the method.

The device states of a test sequence may be directly outputted from peripheral devices and then used directly in the establishment of the test sequence. However, these device states may also be established externally from a peripheral device. For example, a digital camera may record a digital image, which is then supplied to an image processing algorithm configured for determining whether a workpiece is correctly located in that digital image, and the image processing algorithm then supplies the device state(s) accordingly. As an example, a peripheral device may provide an analogue signal to a programmable logic circuit, which in turn process this signal to provide a logic signal as an input to one or the peripheral ports.

Even though a device state of a test sequence is not necessarily supplied directly from a peripheral device, note that the test sequence of device states is typically indicative of an interaction of the peripheral device, for example an interaction of the peripheral device with an apparatus, item, or entity external from that peripheral device, for example a human operator of the robot system.

Monitoring inputs of the at least one peripheral device to identify one or more input-receiving peripheral ports may be understood as the action of listening for inputs on any peripheral port of the plurality of peripheral ports and determining through which specific one or more peripheral ports the inputs are received through. A peripheral port through which an input (or at least a part of a test sequence) is received is referred to as an input-receiving peripheral port throughout the present disclosure.

Upon having established the test sequence of device states, these device states may then serve as a catalogue or inventory of device states (and combinations thereof) which peripheral devices are capable of supplying through the various engagements to which they have been exposed. The user may, for example, directly select any of these device states in configuring the robot system control process, for example by using device states or combinations of device states as one or more conditions for particular parts of the control process.

Generally, configuring the robot system control process may be understood as programming, reprogramming, reconfiguring, or adjusting/changing the programming of the robot system control process. Typically, the configuration of the robot system control process relates to configuring the normal operation of the robot system, in which the robot system performs its usual repetitive operations.

The configuring of the robot system control process is based on the device states of the test sequence and also based on the one or more input-receiving peripheral ports. Thus, not only the content of the test sequence is used in the programming of the robot system control process (or robot task), but the configuring also takes into account which peripheral ports (or channels) that the test sequence is received through. The peripheral ports are referred to as input-receiving peripheral ports throughout the present disclosure. It should be noted that the test sequence may be received through a single input-receiving peripheral port or through two or more input-receiving peripheral ports of the plurality of peripheral ports, the number of input-receiving peripheral ports depending on the number of peripheral devices needed for establishing the test sequence. It is thereby to be noted that the specific input-receiving peripheral ports are thus used in the configuring/programming of the robot task (robot system control process).

The step of configuring a robot system control process results in a robot system control process (or robot task) being created. In addition to defining a task to be performed by the robot system, the robot task also specifies the conditions to be fulfilled prior to execution of the task. These conditions are that specific inputs (similar sequence of device states) similar to the test sequence are received through the same one or more peripheral ports (input-receiving peripheral ports) as those peripheral port(s) used in the step of interactively engaging the at least one peripheral device.

In some embodiments, the method for configuring the robot system is a method for configuring logic functionalities of a robot system control process of a robot system in relation to at least one peripheral device of the robot system.

In embodiments of the invention, the method comprises a subsequent step of operating the robot system by executing the robot system control process on the robot controller to control operation of the robot arm according to the robot system control process. By inclusion of this subsequent step, the above disclosed method also becomes a method for operation of a robot system.

Thus, after performing a configuration of the robot system control process based on device states of the test sequence, this configured robot system control process may advantageously serve as an improved program upon which the robot system can be operated.

In embodiments of the invention, the step of operating the robot system comprises waiting for inputs of the at least one peripheral device before executing at least a part of the robot control process.

The step of operating the robot system may include waiting, for example by the robot controller, for inputs from the at least one peripheral device before the robot task, or at least a part thereof, is carried out. By waiting is understood that the robot system will only perform a given configured task (or at least a part thereof) once the prerequisites (or conditions) for carrying out the task is fulfilled. In practice, some waiting time may pass before specific inputs are received and the conditions for executing a specific robot task are fulfilled. It should be noted that the waiting may only be in respect of a given robot task, and if multiple robot tasks are configured, it may be the case that the robot controller waits for fulfilment of the conditions for a first task, but in the meantime a second robot task may be executed.

In embodiments of the invention, the robot system is in a non-operating state during the step of configuring the robot system control process.

By a non-operating state is understood a state in which the robot system is not executing any robot tasks (or robot system control process). It should be noticed that such a non-operating state does not exclude the possibility of the robot system, or even parts of the robot system, to be moving, as some configurations of the robot system may require the system to perform one or more movements in order to carry out the step of interactively engaging the at least one peripheral device. An example of a non-operating state is an idle state where the robot system is stationary, i.e., non-moving. Having the robot system in a non-operating state during configuration of a robot system control process is advantageous in that there is no risk that one already pre-configured robot task negatively affects the configuration of new robot task.

In embodiments of the invention, the robot system control process is based on operation of the at least one peripheral device.

In other words, during normal operation of the robot system according to the robot system control process, the at least one peripheral device is actually used. That is, the at least one peripheral device is not just used for programming the robot system.

In embodiments of the invention, the operation of the at least one peripheral device is based on communication via the respective peripheral port of the plurality of peripheral ports of each of the at least one peripheral devices.

Thus, the actual operation of the robot system, in which the at least one peripheral device is used, may utilize the same connection(s) to the plurality of peripheral ports which was used during configuration of the robot system control process. This may result in simplified transitions between configuration and operation of the robot system, which is advantageous.

In embodiments of the invention, the step of interactively engaging the at least one peripheral device is a step of interactively manually engaging the at least one peripheral device.

Alternatively, the step of interactively engaging the at least one peripheral device comprises manually engaging/affecting/activating the at least one peripheral device.

In embodiments of the invention, the step of interactively engaging the at least one peripheral device is performed apart from a normal operational mode of the robot system mode While a robot system is performing some operational task in a repetitive manner, the robot system may be referred to as being in a normal operational mode. In contrast, some embodiments of the invention relate to configuring the robot system while it is in an analysis mode or a programming mode, which is different from the normal operational mode.

In other words, in embodiments of the invention, the step of interactively engaging the at least one peripheral device is performed to configure the robot system control process, and thereby the robot system. Thus, typically, the configured robot system control process may then be used for normal operation, but the establishment of the configured robot system control process is not a part of the normal operation.

In embodiments of the invention, the method comprises a step of graphically displaying the test sequence of the device states.

By graphically displaying the test sequence of device states, an otherwise complex set of data may become comprehendible for the user, which is advantageous. In particular, sequences, combinations and/or durations of device states are easier to comprehend, and, accordingly, the configuration of the robot system control process may become more straightforward, which is advantageous.

In embodiments of the invention, the step of graphically displaying the test sequence of device states is performed via a graphical user interface.

In embodiments of the invention, the step of configuring the robot system control process is performed via the graphical user interface.

By having a graphical user interface through which both the test sequence of device states may be displayed, and though which the robot system control process may be configured, the process of configuring/programming the robot system, which can otherwise be a lengthy iterative process, may become more intuitive and easier, which is advantageous. The graphical user interface which displays the test sequence of device states, and which is also used to perform the step of configuring the robot system control process may for example be a programming environment for programming the robot system.

In embodiments of the invention, the method comprises a step of monitoring the inputs of the at least one peripheral device to the plurality of peripheral ports to identify input-receiving peripheral ports of the plurality of peripheral ports, wherein the step of graphically displaying the test sequence is based on inputs to the input-receiving peripheral ports.

Some robot system may have a large number of peripheral ports available for connections with peripheral devices. Simply displaying all of these ports during configuration of the robot system may easily provide a programming environment which is bewildering to the user.

By explicitly identifying input-receiving peripheral ports, an improved programming environment may be provided, which is advantageous, as a user can focus on the peripheral parts relevant for a specific situation.

In embodiments of the invention, the step of graphically displaying the test sequence is based at least partially exclusively on the inputs to the input-receiving peripheral ports.

In this context, displaying the test sequence based at least partially exclusively on inputs to the input-receiving peripheral ports may be understood as not showing at least some of the peripheral ports which are not a part of the input-receiving peripheral ports.

In other words, at least some signals of peripheral ports not actually receiving an input from a peripheral device are not displayed.

By not displaying unnecessary signals, a configuration of the robot system control process may be more manageable, which is advantageous.

In embodiments of the invention, the step of graphically displaying the test sequence comprises displaying representations of the input-receiving peripheral ports.

Examples of representations of input-receiving peripheral ports are graphical representations, numbered representations, and location representations. Such representations may ease identification of relevant peripheral ports, which is advantageous.

In embodiments of the invention, the test sequence comprises a time series of the device states.

In embodiments of the invention, at least a subset of the time series of the device states is used in the step of configuring the robot system control process.

A time series of device states may be understood as a number of device states obtained, established, and/or recorded sequentially/consecutively, for example sequentially (in a particular sequence), or consecutively in time. Using a test sequence comprising a time series may provide an improved basis for configuring a robot system control process. In particular, a time series of device states may permit several different sequences, combinations and durations of device states to be explored by the user while interactively engaging with any peripheral devices. And such different sequences, combinations and/or durations of device states may then be used, either directly or as inspiration, when configured the robot system control process. subset of the time series of the device states may for example refer to a sequences, a combination (of device states), or a durations (of a logic state) of the device states.

In embodiments of the invention, the test sequence comprises one or more digital signal edges.

In embodiments of the invention, at least one of the one or more digital signal edges is used in the step of configuring the robot system control process.

Thus, not only device states, but also sequences and/or transitions of device states, may be used for basis when configuring a robot system control process. In particular, a digital signal edge may be used to specify an exact timing, or an exact transition, which is advantageous.

In embodiments of the invention, the step of configuring the robot system control process is based on determining a selection of the device states of the test sequence.

Determining a selection may for example be understood as establishing a selection, for example by a human operator. The selection of device states may for example be determined via a graphical user interface.

A selection of the device states may involve a single device state, or it may involve combinations of several device states, e.g., from different peripheral devices.

A selection of a combination of device states of the test sequence may for example be established via a state combination tool accessible via a graphical user interface.

In embodiments of the invention, the selection of the device states comprises device states established at several different times during the step of interactively engaging the at least one peripheral device.

By using a selection of device states established at several different times, it is possible to build a more complex and rich robot system control process. Further, various interactive engagements with peripheral devices can be performed in a single session, upon which the desired device states can be selected for the robot system control process.

A selection of device states established at different times may for example establish a sequence of device states. A selection of such a sequence of device states of the test sequence may for example be established via a state sequence tool accessible via a graphical user interface.

In embodiments of the invention, the selection of the device states comprises one or more device states at an end time of the test sequence.

One or more device states at an end time of the test sequence may be understood as the logic state or states established at the very end. For example, if a test sequence of device states of a single peripheral device is first "low" then "high", then the latter of these states, "high", is the logic state at the end time. In embodiments with several peripheral devices, the device states at the end time may refer to the combination of the device states associated with the individual peripheral devices (or a subset hereof) at the end time.

By specifically including the device states at the end time, the user can perform interactive engagement with peripheral devices until a desirable combination of device states or engagements have been performed, upon which this desirable combination is directly available for basis of configuring the robot system control process, which is advantageous.

A selection of one or more device states at an end time of the test sequence may for example be established via an end state tool accessible via a graphical user interface.

In embodiments of the invention, the selection of the device states comprises a digital signal edge of the device states of the test sequence.

A digital signal edge may be used to specify an exact timing, or an exact transition, which is advantageous.

A selection of a digital signal edge of the device states of the test sequence may for example be established via a signal edge tool accessible via a graphical user interface.

In embodiments of the invention, the selection of the device states comprises a duration of one of the device states of the test sequence.

Including a duration of a logic state as an input when configuring a robot system control process may advantageously enable a larger wealth of various tools in the configuration of the robot system control process.

A selection of a duration of a logic state of the test sequence may for example be established via a state duration tool accessible via a graphical user interface.

In embodiments of the invention, the step of configuring the robot system control process further comprises selection of device states apart from the test sequence.

Thus, even though the robot system control process is at least partially based on device states of a test sequence established through interactively engaging a peripheral device, additional device states (apart from the test sequence) may also be included during the configuration of the robot system control processes. Such device states may for example be device states which can be implemented in a robot system control process via a conventional user interface, for example by manually specifying the desired device states. By combining device states obtained from interactive engagements with device states obtained via conventional means, a highly versatile programming environment may advantageously be provided.

A selection of device states apart from the test sequence may for example be established via a state duration tool accessible via a graphical user interface.

In embodiments of the invention, the step of configuring the robot system control process comprises adjusting the device states of the test sequence prior to implementation in the robot system control process.

The interactive engagement may potentially be prone to imprecisions and inaccuracies. Therefore, ensuring that the device states of the test sequence can be adjusted prior to implementation into the robot system control process may ensure improved precision, accuracy, and flexibility, which is advantageous. The imprecision and inaccuracies can in some cases be improved by adding hysteresis, thresholds, filters and or similar techniques to the interpretation of the signal indicating the device states. Hysteresis is a method to compensate for electrical contact bounce by implementing a filter in the time domain. A threshold is another method, to filter in the signal value domain, for interpreting analogue and digital values to a device state for instance in form of a logic state.

An adjustment of the device states of the test sequence prior to implementation in the robot system control process may for example be established via a state adjustment tool accessible via a graphical user interface.

In embodiments of the invention, the selection of device states is used as basis to implement one or more operational conditions of the robot system control process.

An operational condition is an example of how a device state of a test sequence may be used in a robot system control process. An example is a peripheral device which is a weight sensor, which upon a certain weight or threshold, and over a certain time or with a hysteresis provides a particular device states in form of a logic state. This logic state can then be established by interactively engaging with the weight sensor and implemented in the robot system control process as an operational condition. For example, a particular operation (of the robot system control process) is performed on the condition that this logic signal is detected, e.g., by the robot controller.

Furthermore, several operational conditions may be implemented using the selection of device states, which may further improve facilitation of complex programming and configuration tasks.

In embodiments of the invention, the at least one peripheral device is at least two peripheral devices, for example at least three peripheral devices, such as at least four peripheral devices.

In embodiments of the invention, the test sequence of the device states comprises several sub-sequences of the device states, wherein each of the several sub-sequences of the device states is based on input of an individual peripheral device of the at least one peripheral device to the plurality of peripheral ports, wherein the selection of the device states comprises device states from at least two of the several sub-sequences of the device states.

Robot systems having several peripheral devices are particularly difficult to handle and program in practice. However, by facilitating configuration of such systems via interactive engagement with these several peripheral devices, the accessibility of such systems for the user, the duration for configuring robot system control processes of such systems, and the eventual robot system control process may be improved, which is advantageous. In particular, establishing a desired set of device states to use in of the robot system control process does not need to rely on an overview of peripheral devices, their wiring to the peripheral ports, and the peripheral ports which are actually in use. Instead, the user can simple interactively engage with each peripheral device to establish the device states.

In embodiments of the invention, the method comprises a step of initiating an analysis mode of the robot system.

In embodiments of the invention, the analysis mode comprises automatically performing the step of graphically displaying the test sequence, wherein the analysis mode further enables the step of configuring the robot system control process.

In embodiments of the invention, the analysis mode comprises automatically performing the step of monitoring the inputs of the at least one peripheral device.

In some embodiments, an explicit analysis mode is initiated, in which the peripheral devices and their logic responses to various engagements may be explored. The analysis mode is distinct from a normal operational mode, in which, e.g., a repetitive task is performed autonomously by the robot system. An analysis mode is different from the normal operational mode, in the sense that the robot can be reconfigured based on device states of a test sequence.

By having a distinct analysis mode, both the robot arm and the robot controller may be put in conditions which are suitable for configuring the robot system control process, which is advantageous. In particular, the robot arm may typically not move, unless a human operator makes the robot arm move. Thus, the human operator can safely and freely interactively engage with any relevant peripheral devices.

The initiation of the analysis mode may further automatically initiate performance of other procedures or steps. Such automatic initiation of one or more steps may thus altogether smoothen the entire procedure required for configuring a robot system control process.

In embodiments of the invention, the method comprises a step of recording the test sequence of device states.

In embodiments of the invention, the method comprises a step of digitally storing the test sequence of device states.

The step of recording the test sequence of device states may be performed to establish a recorded signal. This recorded signal may also be referred to as a recorded peripheral signal. The recorded signal may be the test sequence of device states, be a representation thereof, comprise the test sequence of device states, or comprise a representation of the test sequence of device states.

The recorded signal may be stored in the step of digitally storing the test sequence of device states. In other words, the step of digitally storing the test sequence of device states may be a step of digitally storing the recorded signal, wherein, for example, the recorded signal comprises the test sequence of device states or a representation thereof.

The step of configuring the robot system control process may be based on the step of recording the test sequence of device states and/or the step of storing the test sequence of device states, for example in the sense that the step of configuring the robot system control process is based on the device states of the test sequence via the recorded signal.

The step of recording may for example be performed by the robot controller. The step of recording may be performed in relation to the step of interactively engaging the at least one peripheral device, for example simultaneously/synchronously. The step of storing the test sequence of device states may be a step of storing the test sequence of device states on a digital storage, such as a digital storage of the robot system. Examples of digital storages are hard disk drives, solid state drives, USB flash drives, and cloud-based storages.

An aspect of the invention relates to a robot system comprising:

- a robot arm;
- a robot controller configured to control operation of the robot arm;
- a plurality of peripheral ports;

at least one peripheral device, wherein each of the at least one peripheral device is communicatively connected to a respective peripheral port of the plurality of peripheral ports, wherein the robot system is configured to identify one or more input-receiving peripheral ports of the plurality of peripheral ports, and wherein the robot system comprises a robot system control process which is configurable based on device states of a test sequence established based on inputs of the at least one peripheral device to the plurality of peripheral ports when the at least one peripheral device is interactively engaged and based on the one or more input-receiving peripheral ports of the plurality of peripheral ports.

Generally, robot systems according to the invention may have the same or similar advantages as methods of the invention.

In embodiments of the invention, the robot controller is configured to control operation of the robot arm based on the robot system control process.

For example, the robot controller is configured to control operation of the robot arm based on the robot system control process during a normal operational mode.

In embodiments of the invention, the robot comprises a plurality of robot joints connecting a robot base to a robot tool flange.

In embodiments of the invention, the plurality of peripheral ports of the robot system is a plurality of peripheral ports of the robot controller.

In other words, the robot controller comprises the plurality of peripheral ports.

In embodiments of the invention, at least one peripheral port of the plurality of peripheral ports is a physical socket for a physical plug of a cable of the at least one peripheral devices.

Nevertheless, note that, in some embodiments, peripheral devices are wirelessly communicatively connected to peripheral ports. Also, in some embodiments, one or more peripheral devices are connected to the plurality of peripheral ports through a wire or cable, while one or more other peripheral devices are connected wirelessly to the plurality of peripheral ports. Thus, the peripheral ports may, at least in some embodiments, comprise both ports for wired connections and ports for wireless connections.

In embodiments of the invention, at least one peripheral port of the plurality of peripheral ports is a wireless communication port configured to wirelessly communicate with a peripheral device of the at least one peripheral device.

For example, in an embodiment of the invention, each of the at least one peripheral device is communicatively connected to a respective wireless communication port of the plurality of peripheral ports.

A wireless communication port may wirelessly communicate by being configured to send and/or receive signals from a peripheral device of the at least one peripheral device.

A wireless communication port may also be referred to as a wireless communication device.

In embodiments of the invention, the robot system further comprises a graphical user interface configured to display the device states of the test sequence. A user configuring a robot system control process of the robot system will thus easily be able to establish an overview of the device states of the test sequence and thus easier configure the robot system control process based on the device states of the test sequence.

In embodiments of the invention, the robot system control process is configurable based on selecting device states of the test sequence via the graphical user interface. This makes it easier for a user configuring a robot system control process of the robot system to select and configure the control process of the robot system based on the device states of the test sequence.

In embodiments of the invention, the robot system control process is configurable through the graphical user interface. By having a graphical user interface through which both the test sequence of device states may be displayed, and though which the robot system control process may be configured, the process of configuring/programming the robot system, which can otherwise be a lengthy iterative process, may become more intuitive and easier, which is advantageous.

In embodiments of the invention, the at least one peripheral device comprises any of a sensor, a user input mechanism, an auxiliary robot, automation equipment, a processing apparatus, a computing device, and a camera such as a 3D camera.

Examples of sensors are pressure sensors, force sensors, proximity sensors, touch sensors, distance sensors, weight sensors, light/radiation sensors, magnetic field sensors, and chemical sensors. Examples of automation equipment are conveyors, feeding mechanisms, external servo axis, sensor mats, light curtains, PLC devices etc. Examples of processing apparatus are CNC machines, pressing machines, pinching machines, lathes, labelling machines, printing machines, moulding machines etc. An example of a computing device is a personal computer. In some embodiments, a robot tool may also be considered a peripheral device, whereas in some other embodiments, a robot tool is not considered a peripheral device.

In embodiments of the invention, the robot system is configured to record the test sequence of device states.

For example, the robot controller may record the test sequence of device states. Or the test sequence of device states may be recorded by a recording device, such as a separate recording device configured to record the test sequence of device states.

In embodiments of the invention, the robot system comprises a digital storage in which the test sequence of device states is stored.

In embodiments of the invention, the robot system can be set in an analysis mode, where the robot system in the analysis mode is configured to monitor the inputs of the at least one peripheral device to the plurality of peripheral ports (331) while the at least one peripheral device (330) is interactively engaged. A user configuring a robot system control process of the robot system can for instance set the robot system into the analysis mode and the robot system will then monitor the input signals of the at least one peripheral device for instance and the user can hereby demonstrate a process to be performed by the peripheral devices. Consequently, a user can set the robot system into analysis mode and the robot system will then perform an analysis of the input signals from the peripheral devices during the period where user interactively engage with the peripheral device(s). In the analysis mode the robot system can for instance be configured to record the test sequence of the device states, display the test sequence of device states on a graphical user interface, enable a user to select device states on a graphical user interface, configure recorded device states via a via a graphical user interface.

In embodiments of the invention, the robot system is, in the analysis mode, configured to identify input-receiving peripheral ports of the plurality of peripheral ports. The robot system can for instance be configured to register which of the plurality of peripheral ports that receives an input signal whereby the robot system for instance can record the device states of only the peripheral ports that are connected to a peripheral device. This can assist the user configuring the robot system control process of the robot system as the robot system can be configured to record only device states of peripheral ports connected to a peripheral device. Consequently, the user can easier identify which of the peripheral ports that are used by the robot system. For instance, in an embodiment the peripheral ports can be configured as floating ports having a voltage of 2-3V when not connected to a peripheral device and which are either high (+5V) or low (0V) when a peripheral device is connected to the port. The robot system can then register connected peripheral ports as being either high or low, while ports still floating is considered as not connected to a peripheral device.

In embodiments of the invention, the robot system is, in the analysis mode, configured to identify input-receiving peripheral ports of the plurality of peripheral ports where the state of the input signal changes. This can assist the user configuring the robot system control process of the robot system as the robot system can be configured to only record and/or display the device states of peripheral devices which have change their device state during the process of interactively engaging the peripheral devices.

This digital storage may for example be accessible via a programming device, such as a personal computer or a teach pendant, from which the robot system control process can be configured.

In embodiments of the invention, the robot system control process comprises a robot arm control process and peripheral device control process separate from the robot arm control process,

- wherein the robot controller is configured to control operation of the robot arm based on the robot arm control process,
- wherein the robot controller is configured to control operation of the at least one peripheral device based on the peripheral device control process.

In embodiments of the invention, operation of the robot system according to the robot system control process comprises interdependent communication between the robot arm control process and the peripheral device control process.

In embodiments of the invention, at least one of the device states of the test sequence upon which the robot system control system is based is an operational condition in the robot system control process.

In embodiments of the invention, the interdependent communication between the robot arm control process and the peripheral device control process comprises the operational condition.

In embodiments of the invention, the robot arm control process and the peripheral device control process are arranged to be parallelly executed by the robot controller, for example on separate cores of the robot controller.

By having the robot controller being capable of separately controlling the robot arm and peripheral devices via separate control processes, improved configuration and control of the robot system may advantageously be obtained. In particular improved communication speed between the control process of the robot arm and the control process of peripheral devices (interdependent communication) may be obtained, for example communication involving a logic state of a test sequence established interactive engagement.

The different control processes may be programmed in the same programming environment. The peripheral device control process may optionally directly control operation of any peripheral devices without intermediate circuitry such as a programmable logic circuit responsible for signal processing, facilitation of communication, and logic operations.

In embodiments of the invention, the peripheral device control process is associated with control of at one or more auxiliary peripheral devices separate from the at least one peripheral device.

In the context of the present disclosure, an auxiliary peripheral device may be understood as one which is not operated based on or associated with device states established via interactively engaging such devices. Thus, embodiments of the invention may involve both peripheral devices which have been interactively engaged to establish device states upon which the robot system control process has been configured, and auxiliary peripheral devices which have not been interactively engaged to establish device states upon which the robot system control process has been configured.

In embodiments of the invention, the robot system is configured to perform any method according to this disclosure.

THE DRAWINGS

Figure 2:
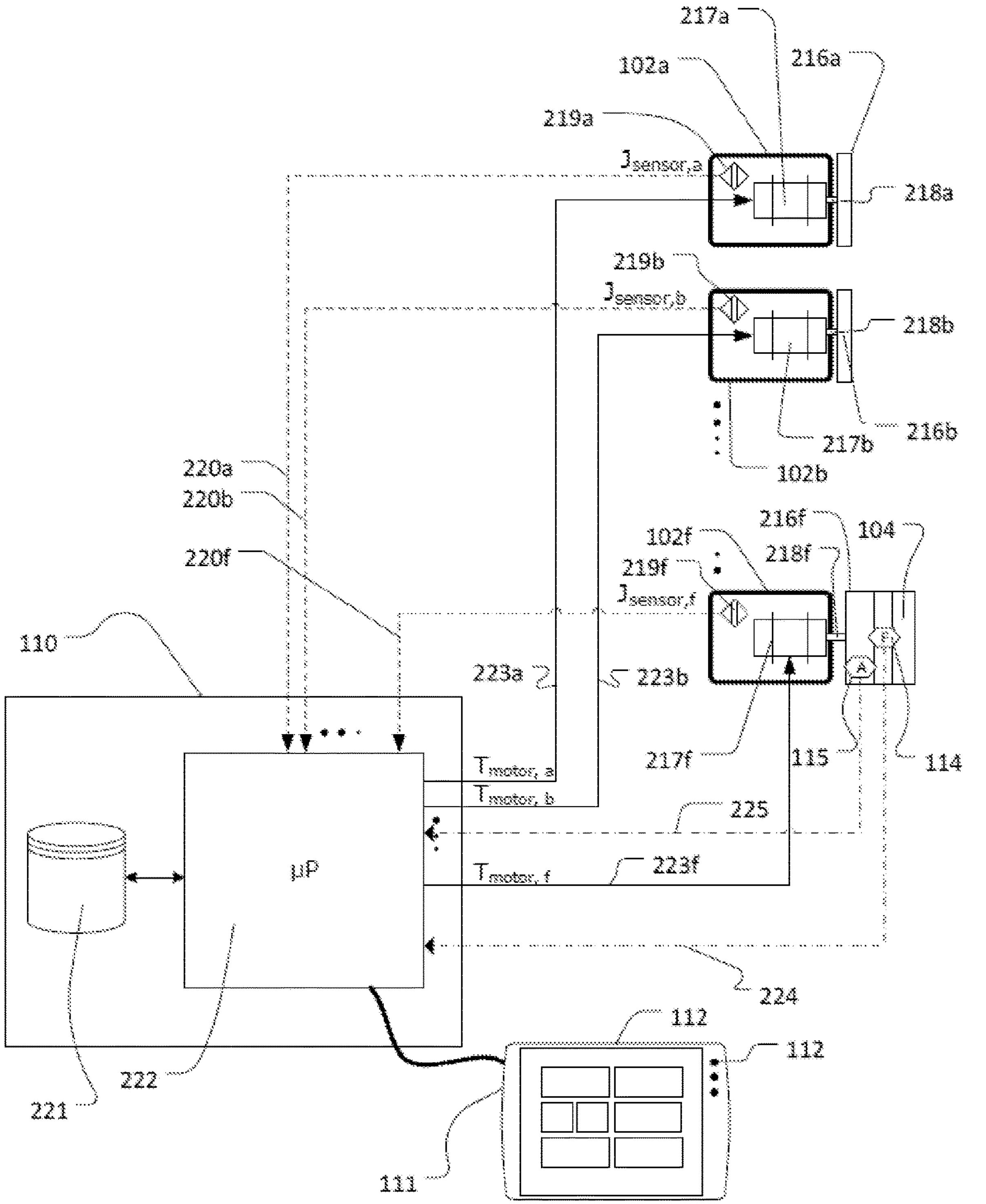
Figure 3:
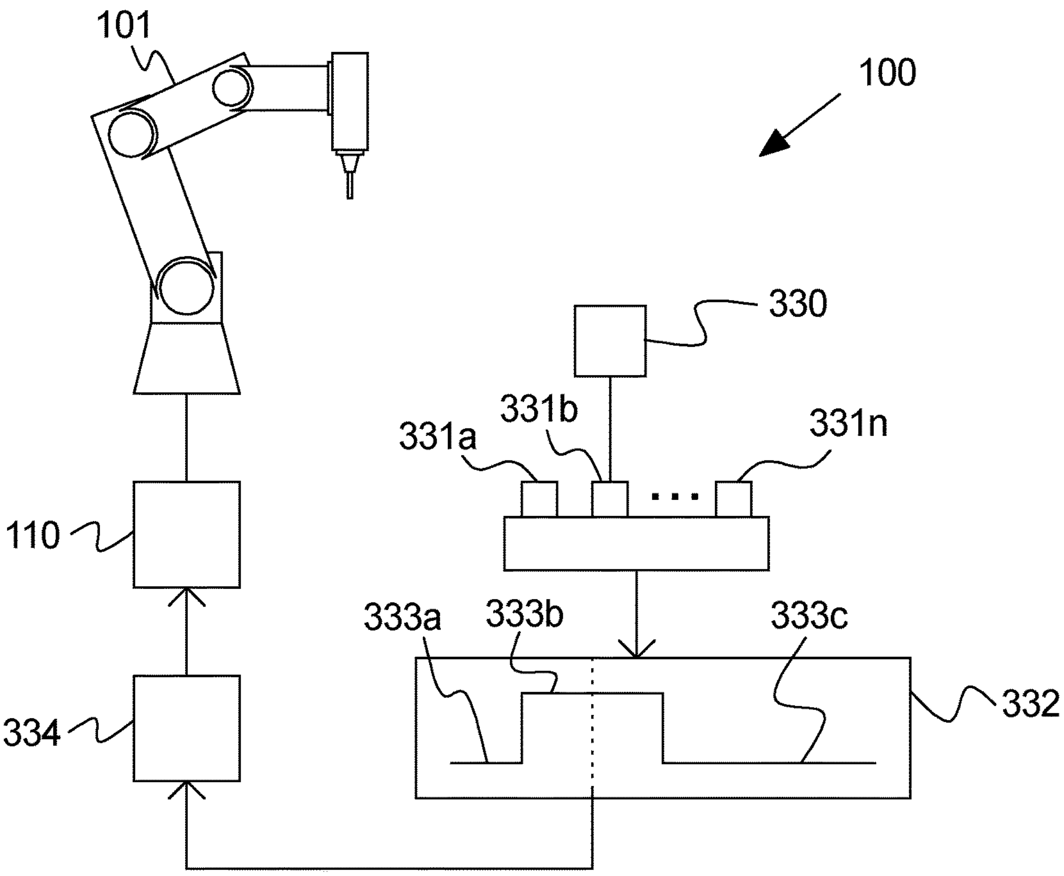
Figure 4:
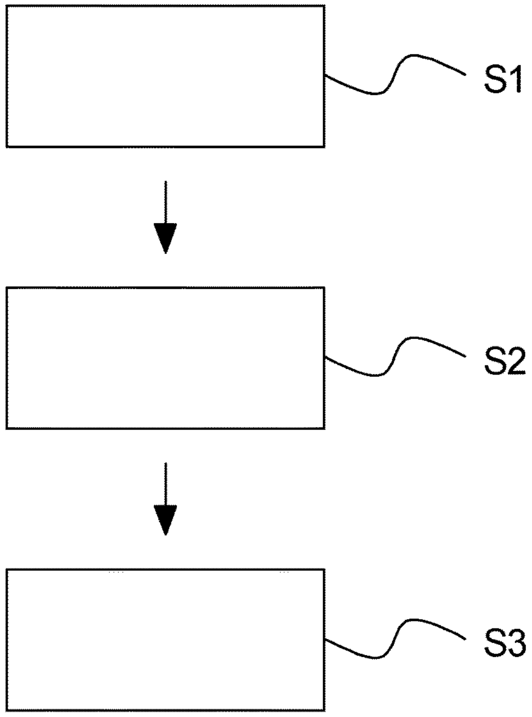
Figure 5:
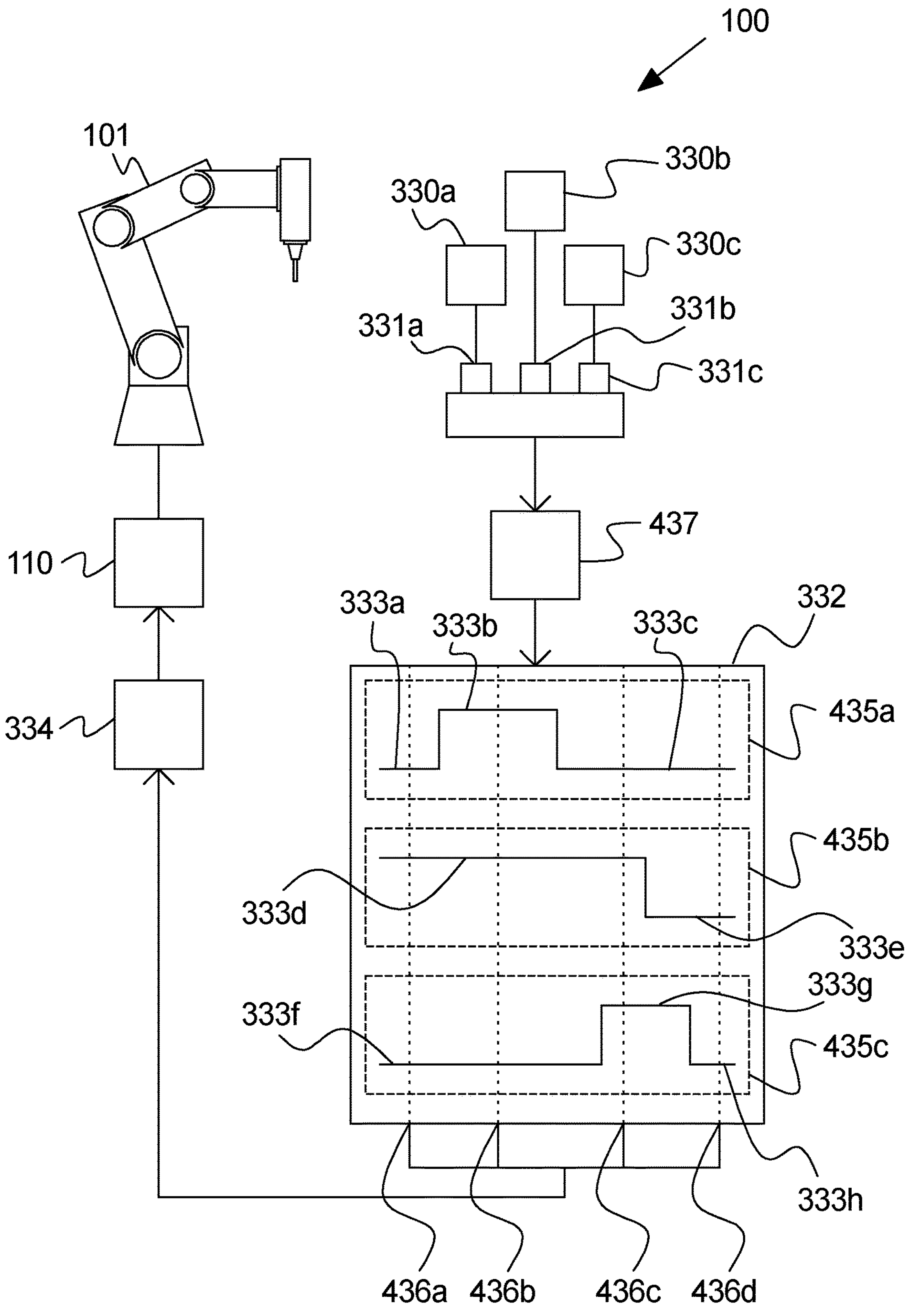
Figure 6:
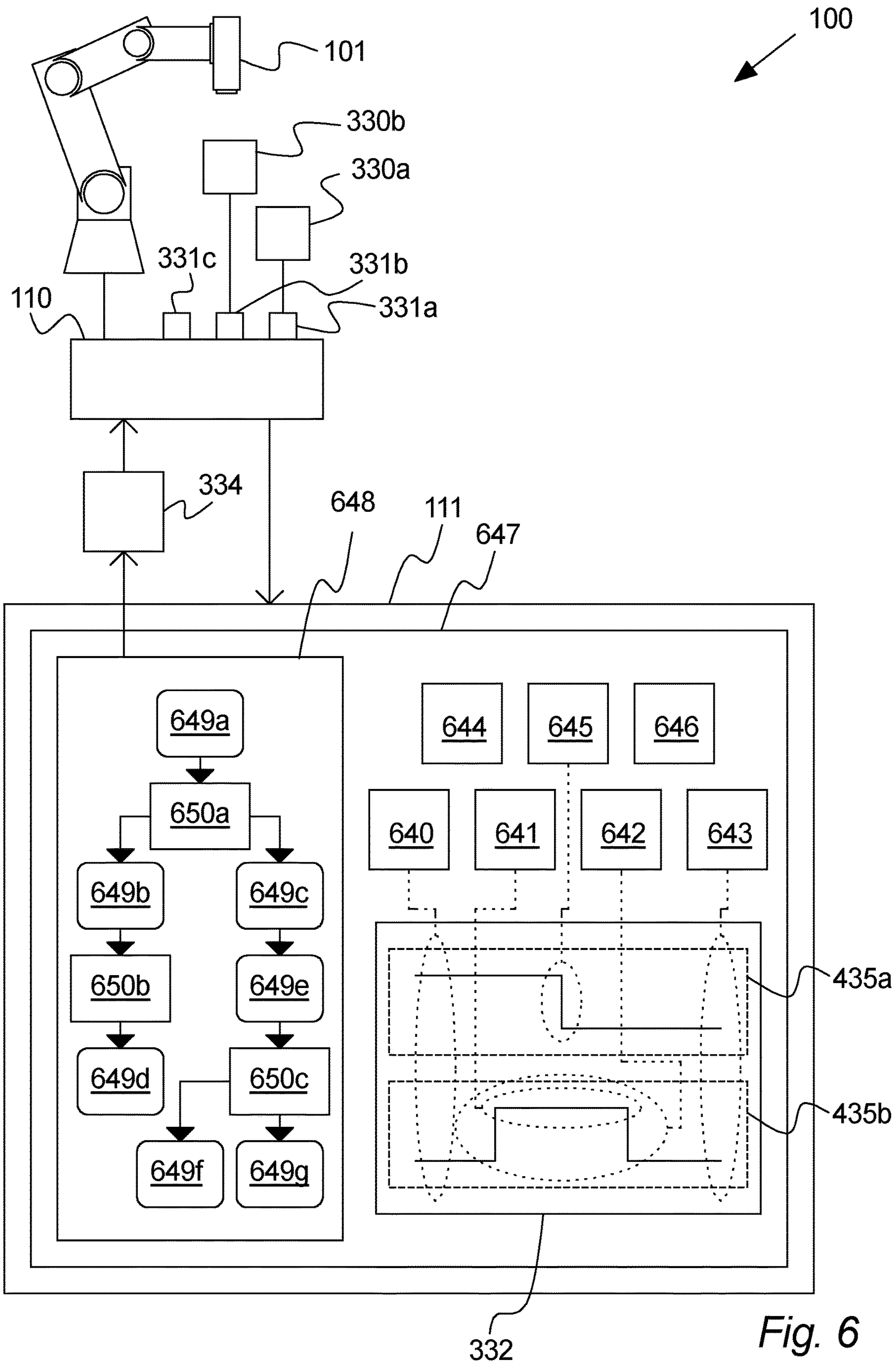
Figure 7:
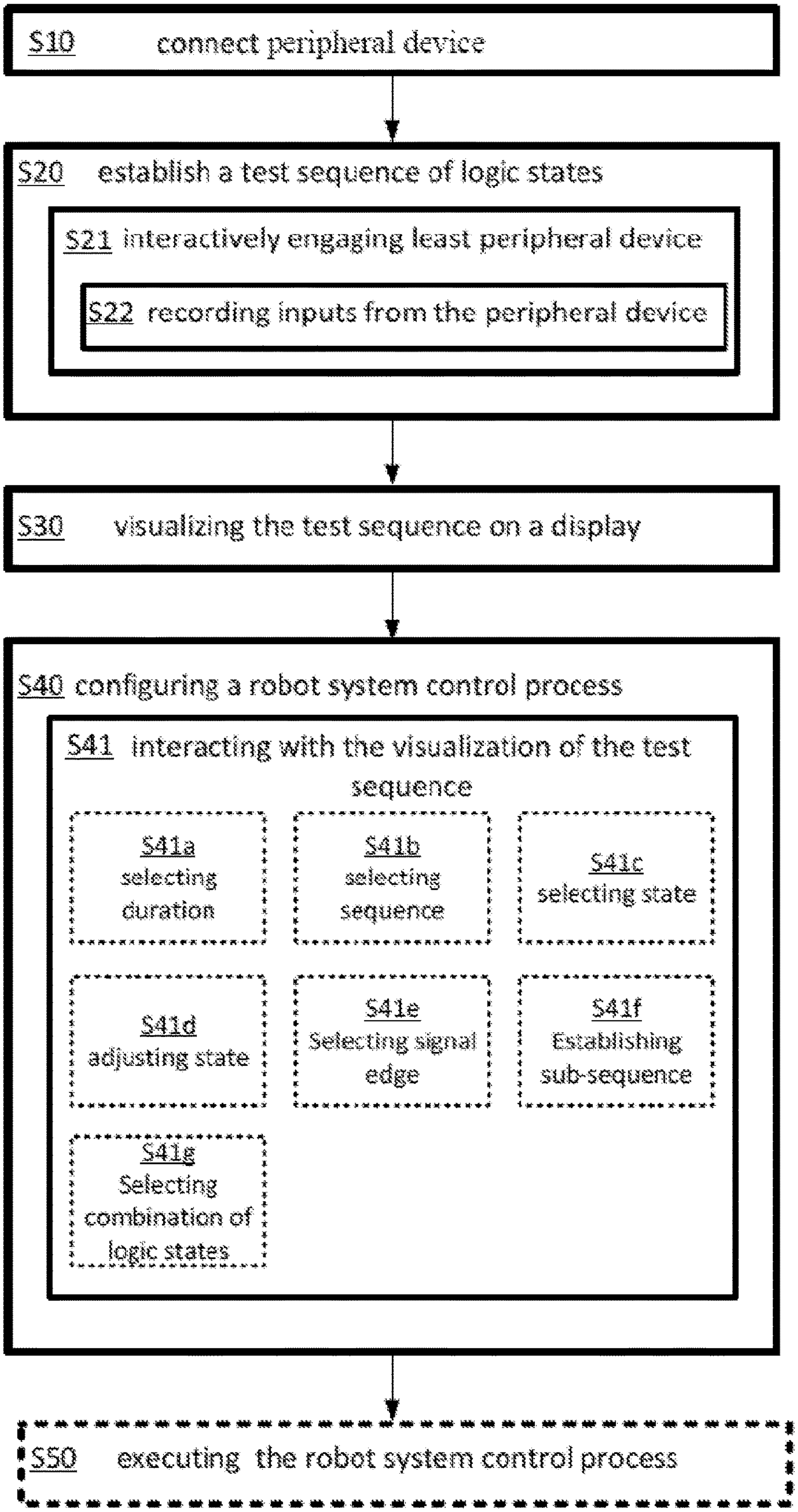

Various embodiments of the invention will in the following be described with reference to the drawings where FIG. 1 illustrates a robot arm according to the present invention, FIG. 2 illustrates a simplified structural diagram of the robot arm and part of the robot controller, FIG. 3 illustrates a robot system according to an embodiment of the invention, FIG. 4 illustrates method steps according to an embodiment of the invention, FIG. 5 illustrates a robot system comprising several peripheral devices according to an embodiment of the invention, FIG. 6 illustrates a robot system comprising a graphical user interface with various tools according to an embodiment of the invention, and FIG. 7 illustrates method steps according to another embodiment of the invention.

DETAILED DESCRIPTION

The present invention is described in view of exemplary embodiments only intended to illustrate the principles of the present invention. The skilled person will be able to provide several embodiments within the scope of the claims.

FIG. 1 illustrates a robot arm 101 comprising a plurality of robot joints 102*a*, 102*b*, 102*c*, 102*d*, 102*e*, 102*f* connecting a robot base 103 and a robot tool flange 104. A base joint 102*a* is configured to rotate the robot arm 101 around a base axis 105*a* (illustrated by a dashed dotted line) as illustrated by rotation arrow 106*a*; a shoulder joint 102*b* is configured to rotate the robot arm around a shoulder axis 105*b* (illustrated as a cross indicating the axis) as illustrated by rotation arrow 106*b*; an elbow joint 102*c* is configured to rotate the robot arm around an elbow axis 105*c* (illustrated as a cross indicating the axis) as illustrated by rotation arrow 106*c*, a first wrist joint 102*d* is configured to rotate the robot arm around a first wrist axis 105*d* (illustrated as a cross indicating the axis) as illustrated by rotation arrow 106*d* and a second wrist joint 102*e* is configured to rotate the robot arm around a second wrist axis 105_e_ (illustrated by a dashed dotted line) as illustrated by rotation arrow 106_e_. Robot joint 102_f_ is a tool joint comprising the robot tool flange 104, which is rotatable around a tool axis 105_f_ (illustrated by a dashed dotted line) as illustrated by rotation arrow 106_f_. The illustrated robot arm is thus a six-axis serial robot arm with six degrees of freedom with six rotational robot joints, however it is noticed that the present invention can be provided in robot arms comprising less or more robot joints and also other types of robot joints such as prismatic robot joints providing a translation of parts of the robot arm for instance a linear translation. Alternatively, robot arms can also be constructed using a parallel joint structure or a mixture of both serial and parallel kinematics structure.

A robot tool flange reference point 107 also known as a Tool Center Point (TCP) is indicated at the robot tool flange and defines the origin of a tool flange coordinate system defining three coordinate axis xflange, yflange, zflange. However, note that the tool flange and the Tool Centre Point is not necessarily the same in all embodiments of the invention. In the illustrated embodiment the origin of the robot tool flange coordinate system has been arrange on the tool flange axis 105_f_ with one axis (zflange) parallel with the tool flange axis and with the other axes xflange, yflange parallel with the outer surface of the robot tool flange 104. Further a base reference point 108 is coincident with the origin of a robot base coordinate system defining three coordinate axes xbase, ybase, zbase. In the illustrated embodiment the origin of the robot base coordinate system has been arrange on the base axis 105_a_ with one axis (zbase) parallel with the base axis 105_a_ and with the other axes xbase, ybase parallel with the bottom surface of the robot base. The direction of gravity 109 in relation to the robot arm is also indicated by an arrow and it is to be understood that the robot arm can be arrange at any position and orientation in relation to gravity.

The robot arm comprises at least one robot controller 110 configured to control the robot arm 101 and can be provided as a computer comprising in interface device 111 enabling a user to control and program the robot arm. The controller 110 can be provided as an external device as illustrated in FIG. 1 or as a device integrated into the robot arm or as a combination thereof. The interface device can for instance be provided as a teach pendent as known from the field of industrial robots which can communicate with the controller 110 via wired or wireless communication protocols.

The interface device can for instanced comprise a display 112 and a number of input devices 113 such as buttons, sliders, touchpads, joysticks, track balls, gesture recognition devices, keyboards etc. The display may be provided as a touch screen acting both as display and input device. The interface device can also be provided as an external device configured to communicate with the robot controller 110, for instance as smart phones, tablets, PCs, laptops, etc. In some embodiments of the invention, the robot controller comprises peripheral ports, such as network ports, USB ports, RS485 ports, etc.

The robot tool flange 104 may comprise a force-torque sensor 114 (sometimes referred to simply as force sensor) integrated into the robot tool flange 104. The force-torque sensor 114 provides a tool flange force signal indicating a force-torque provided at the robot tool flange. In the illustrated embodiment the force-torque sensor is integrated into the robot tool flange and is configured to indicate the forces and torques applied to the robot tool flange in relation to the robot tool flange reference point 107. The force sensor 114 provides a force signal indicating a force provided at the tool flange. In the illustrated embodiment the force sensor is integrated into the robot tool flange and is configured to indicate the forces and torques applied to the robot tool flange in relation to the reference point 107 and in the tool flange coordinate system. However, the force-torque sensor can indicate the force-torque applied to the robot tool flange in relation to any point which can be linked to the robot tool flange coordinate system. In one embodiment the force-torque sensor is provided as a six-axis force-torque sensor configured to indicate the forces along and the torques around three perpendicular axes. The force-torque sensor can for instance be provided as any force-torque sensor capable of indicating the forces and torques in relation to a reference point for instance any of the force-torque sensors disclosed by WO2014/110682A1, U.S. Pat. No. 4,763,531, US2015204742. However, it is to be understood that the force sensor in relation to the present invention not necessarily need to be capable of sensing the torque applied to the tool sensor. It is noted that the force-torque sensor may be provided as an external device arranged at the robot tool flange or omitted.

An acceleration sensor 115 is arranged at the robot tool joint 102_f_ and is configured to sense the acceleration of the robot tool joint 102_f_ and/or the acceleration of the robot tool flange 104. The acceleration sensor 115 provides an acceleration signal indicating the acceleration of the robot tool joint 102_f_ and/or the acceleration of the robot tool flange 104. In the illustrated embodiment the acceleration sensor is integrated into the robot tool joint and is configured to indicate accelerations of the robot tool joint in the robot tool coordinate system. However, the acceleration sensor can indicate the acceleration of the robot tool joint in relation to any point which can be linked to the robot tool flange coordinate system. The acceleration sensor can be provided as any accelerometer capable of indicating the accelerations of an object. The acceleration sensor can for instance be provided as an IMU (Inertial Measurement Unit) capable of indicating both linear acceleration and rotational accelerations of an object. It is noted that the acceleration sensor may be provided as an external device arranged at the robot tool flange or omitted.

Each of the robot joints comprises a robot joint body and an output flange rotatable or translatable in relation to the robot joint body and the output flange is connected to a neighbour robot joint either directly or via an arm section as known in the art. The robot joint comprises a joint motor configured to rotate or translate the output flange in relation to the robot joint body, for instance via a gearing or directly connected to the motor shaft. The robot joint body can for instance be formed as a joint housing and the joint motor can be arranged inside the joint housing and the output flange can extend out of the joint housing. Additionally, the robot joint comprises at least one joint sensor providing a sensor signal indicative of at least one of the following parameters: an angular and/or linear position of the output flange, an angular and/or linear position of the motor shaft of the joint motor, a motor current of the joint motor or an external force and/or torque trying to rotate the output flange or motor shaft. For instance, the angular position of the output flange can be indicated by an output encoder such as optical encoders, magnetic encoders which can indicate the angular position of the output flange in relation to the robot joint. Similarly, the angular position of the joint motor shaft can be provided by an input encoder such as optical encoders, magnetic encoders which can indicate the angular position of the motor shaft in relation to the robot joint. It is noted that both output encoders indicating the angular position of the output flange and input encoders indicating the angular position of the motor shaft can be provided, which in embodiments where a gearing have been provided makes it possible to determine a relationship between the input and output side of the gearing. The joint sensor can also be provided as a current sensor indicating the current through the joint motor and thus be used to obtain the torque provided by the motor. For instance, in connection with a multiphase motor, a plurality of current sensors can be provided in order to obtain the current through each of the phases of the multiphase motor. It is also noted that some of the robot joints may comprise a plurality of output flanges rotatable and/or translatable by joint actuators, for instance one of the robot joints may comprise a first output flange rotating/translating a first part of the robot arm in relation to the robot joint and a second output flange rotating/translating a second part of the robot arm in relation to the robot joint.

The robot controller 110 is configured to control the motions of the robot arm by controlling the motor torque provided to the joint motors based on a dynamic model of the robot arm, the direction of gravity acting 109 and the joint sensor signal.

FIG. 2 illustrates a simplified structural diagram of the robot arm 101 illustrated in FIG. 1. The robot joints 102*a*, 102*b* and 102*f* have been illustrated in structural form and the robot joints 102*c*, 102*d*, 102*e* and the robot links connecting the robot joints have been omitted for the sake of simplicity of the drawing. Further the robot joints are illustrated as separate elements however it is to be understood that they are interconnected as illustrated in FIG. 1. The robot joints comprise an output flange 216*a*, 216*b*, 216*f* and a joint motor 217*a*, 217*b*, 217*f* or another kind of actuator, where the output flange 216*a*, 216*b*, 216*f* is rotatable in relation to the robot joint body. The joint motors 217*a*, 217*b*, 217*f* are respectively configured to rotate the output flanges 216*a*, 216*b*, 216*f* via an output axle 218*a*, 218*b*, 218*f*. It is to be understood that the joint motor or joint actuator may be configured to rotate the output flange via a transmission system such as a gear (not shown). In this embodiment the output flange 216*f* of the tool joint 102*f* constitutes the tool flange 104. At least one joint sensor 219*a*, 219*b*, 219*f* providing a sensor signal 220*a*, 220*b*, 220*f* indicative of at least one joint sensor parameter Jsensor,a, Jsensor,b, Jsensor,f of the respective joint. The joint sensor parameter can for instance indicate a pose parameter indicating the position and orientation of the output flange in relation to the robot joint body, an angular position of the output flange, an angular position of a shaft of the joint motor, a motor current of the joint motor. For instance, the angular position of the output flange can be indicated by an output encoder such as optical encoders, magnetic encoders which can indicate the angular position of the output flange in relation to the robot joint. Similar, the angular position of the joint motor shaft can be provided by an input encoder such as optical encoders, magnetic encoders which can indicate the angular position of the motor shaft in relation to the robot joint. The motor currents can be obtained and indicated by current sensors.

The robot controller 110 comprises a processer 222 and memory 221 and is configured to control the joint motors of the robot joints by providing motor control signals 223*a*, 223*b*, 223*f* to the joint motors. The motor control signals 223*a*, 223*b*, 223*f* are indicative of the motor torque Tmotor,a, Tmotor,b, and Tmotor,f that each joint motor shall provide to the output flanges and the robot controller 110 is configured to determine the motor torque based on a dynamic model of the robot arm as known in the prior art. The dynamic model makes it possible for the controller 110 to calculate which torque the joint motors shall provide to each of the joint motors to make the robot arm perform a desired movement. It is to be understood that a motor control signals also can be provided as positions of the output flange and the each robot joint can comprise a processor or logic for calculating the motor torque needed to move the output flange to the indicated position. The dynamic model of the robot arm can be stored in the memory 221 and be adjusted based on the joint sensor parameters Jsensor,a, Jsensor,b, Jsensor,f For instance, the joint motors can be provided as multiphase electromotors and the robot controller 110 can be configured to adjust the motor torque provided by the joint motors by regulating the current through the phases of the multiphase motors as known in the art of motor regulation.

Robot tool flange 216*f* comprises the force sensor 114 providing a tool flange force signal 224 indicating a force-torque FTflange provided to the tool flange. For instance, the force signal-torque FTflange can be indicated as a force vector $$\overrightarrow{F_{sensor}^{flange}}$$

and a torque vector $$\overrightarrow{T_{sensor}^{flange}}$$

in the robot tool flange coordinate system:

$$\overrightarrow{F_{sensor}^{flange}} = \begin{pmatrix} F_{x,sensor}^{flange} \\ F_{y,sensor}^{flange} \\ F_{z,sensor}^{flange} \end{pmatrix} \quad \text{eq. 1}$$

where $$F_{x,sensor}^{flange}$$

is the indicated force along the xflange axis, $$F_{y,sensor}^{flange}$$

is the indicated force along the yflange axis and $$F_{z,sensor}^{flange}$$

is the indicated force along the zflange axis.

In addition to the above, the robot controller 110 of the present invention may include a PLC code import/translate module (not illustrated). Such module facilitates importing PLC code stored e.g. on a PLC or on a PLC code developing tool connected to the robot controller either directly (e.g. wired or wireless connection) or indirectly (via e.g. the internet). Further, such module may facilitate translation of the PLC code to robot control software executable the robot controller.

In an embodiment where the force sensor is provided as a combined force-torque sensor the force-torque sensor can additionally also provide a torque signal indicating the torque provide to the tool flange, for instance as a separate signal (not illustrated) or as a part of the force signal. The torque can be indicated as a torque vector in the robot tool flange coordinate system:

$$\overrightarrow{T_{sensor}^{flange}} = \begin{pmatrix} T_{x,sensor}^{flange} \\ T_{y,sensor}^{flange} \\ T_{z,sensor}^{flange} \end{pmatrix} \quad \text{eq. 2}$$

where $$T_{x,sensor}^{flange}$$

is the indicated torque around the xflange axis, $$T_{y,sensor}^{flange}$$

is the indicated torque around the yflange axis and $$T_{z,sensor}^{flange}$$

is the indicated torque around the zflange axis.

Robot tool joint **102*f* comprises the acceleration sensor 115 providing an acceleration signal 225** indicating the acceleration of the robot tool flange where the acceleration may be indicated in relation to the tool flange coordinate system $$\overrightarrow{A_{sensor}^{flange}} = \begin{pmatrix} A_{x,sensor}^{flange} \\ A_{y,sensor}^{flange} \\ A_{z,sensor}^{flange} \end{pmatrix}$$

where $$A_{x,sensor}^{flange}$$

is the sensed acceleration along the xflange axis, $$A_{y,sensor}^{flange}$$

is the sensed acceleration along the yflange axis and $$A_{z,sensor}^{flange}$$

is the sensed acceleration along the zflange axis.

In an embodiment where the acceleration sensor is provided as a combined accelerometer/gyrometer (e.g. an IMU) the acceleration sensor can additionally provide an angular acceleration signal indicating the angular acceleration of the output flange in relation to the robot tool flange coordinate system, for instance as a separate signal (not illustrated) or as a part of the acceleration signal. The angular acceleration signal can indicate an angular acceleration vector $$\overrightarrow{\alpha_{sensor}^{flange}}$$

in the robot tool flange coordinate system $$\overrightarrow{\alpha_{sensor}^{flange}} = \begin{pmatrix} \alpha_{x,sensor}^{flange} \\ \alpha_{y,sensor}^{flange} \\ \alpha_{z,sensor}^{flange} \end{pmatrix} \quad \text{eq. 3}$$

where $$\alpha_{x,sensor}^{flange}$$

is the angular acceleration around the xflange axis, $$\alpha_{y,sensor}^{flange}$$

is the angular acceleration around the yflange axis and $$\alpha_{z,sensor}^{flange}$$

is the angular acceleration around the zflange axis.

The force sensor and acceleration sensor of the illustrated robot arm are arranged at the robot tool joint **102*f***; however, it is to be understood that the force sensor and acceleration sensor can be arrange at any part of the robot arm and that a plurality of such sensors can be provided at the robot arm.

FIG. 3 illustrates a robot system 100 according to an embodiment of the invention.

The robot system 100 comprises a robot arm 101, such as the robot arm described in relation to FIG. 1, and a robot controller 110 configured to control operation of the robot arm 101, such as described in relation to FIG. 2. Further, the robot system 100 comprises a plurality of peripheral ports **331*a*, 331*b*, . . . 331*n* and a peripheral device 330. In this particular embodiment, the peripheral device 330 is a position sensor. It is communicatively connected to a respective peripheral port 331*b* of the plurality of peripheral ports 331*a*, 331*b*, . . . 331*n*. Even further, the robot system comprises a robot system control process 334, upon which the robot system 100** can be operated.

In the illustrated example, the position sensor is configured to measure the presence of a workpiece at a particular position. When a workpiece is not present at this position, the peripheral device provides a "low" signal and when a workpiece is present at the position, the peripheral device provides a "high" signal.

To configure the robot system control process 334, the peripheral device 330 is interactively engaged. A human operator briefly locates a workpiece at the position at which the position sensor is configured to sense the workpiece. Subsequently, the human operator removes the workpiece from this position.

As a result of this interactive engagement with the peripheral device, a test sequence 332 of device states is established. In the illustrated embodiment the test sequence 332 of device states is a sequence of logic states comprising a first logic state 333*a* which is "low", a second logic state 333*b* which is "high", and a third logic state 333*c* which is "low", corresponding to the workpiece being temporarily present at the location which the peripheral device 330 is configured to sense it. As these device states are obtained sequentially in time, such device states may be referred to as a time series of device states.

With this test sequence 332 of device states 333*a*,333*b*, 333*c* as basis, the human operator now configures the robot system control process 334. In this particular example, the human operator implements a condition for performing a particular automated operational step of the robot arm, namely the condition that a workpiece should be present at the position which the peripheral device 330 is configured to sense. Having the recently established test sequence 332 of device states 333*a*, 333*b*,333*c* at hand, the human operator quickly identifies the correct peripheral port of the plurality of peripheral ports, and the correct logic state "high" 333*b* of the test sequence 332. In a user interface, the human operator selects a particular point in the test sequence of device states 332 (indicated by a vertical dotted line), and implements the logic state 333*b* at this point as a condition in the robot system control process 334.

The robot system 100 can now be operated according to the robot system control process 334, which comprises the above-described logic condition. In practice, in this example, the robot arm is then in an idle state, in which it does not perform any particular operations, until a workpiece is brough to the location at which the peripheral device 330 is configured to sense such a workpiece. When this happens, the peripheral device 330 establishes a logic "high" state, which is the condition for the robot system control process 334 to initiate an automated operation step, such as a step relating to handling the workpiece by the robot.

Provision of the above-described detection of the "high" state to the robot control 110 during operation of the robot system according to the configured robot system control process 334 may involve a communicative connection between the peripheral device 330 and the robot controller 110. In typical embodiments, the plurality of peripheral ports 331*a*,331*b*, . . . 331*n* are integrated in the robot controller 110, but embodiments of the invention are not limited to such topologies. For instance, the peripheral device 330 may be communicatively connected to a peripheral port hub comprising one or more peripheral ports and which is configured to transmit communication from the peripheral device(s) to the remaining robot system, for instance the robot controller FIG. 4 illustrates method steps S1-S3 according to an embodiment of the invention. The embodiment is a method for configuring a robot system, such as the robot system illustrated in FIG. 3.

In a first step S1, each of at least one peripheral device is communicatively connected to a respective peripheral port of a plurality of peripheral ports of the robot system, for example a plurality of peripheral ports of the robot controller. In an example, a first peripheral device is connected to a first peripheral port of the plurality of peripheral ports. In another example, a first peripheral device is connected to a first peripheral port of the plurality of peripheral ports and a second peripheral device is connected to a second peripheral port of the plurality of peripheral ports, separate from the first peripheral port, such that each of the two peripheral devices are communicatively connected to respective peripheral ports.

In a next step S2, the at least one peripheral device is interactively engaged, e.g., interactively engaged by a human operator, to establish a test sequence of device states based on inputs of the at least one peripheral device to the plurality of peripheral ports.

In a next step S3, a robot system control process of the robot system is configured based on the device states of the test sequence. The robot controller may typically be configured to control operation of the robot arm based on the robot system control process. Further, the robot controller may be configured to control operation of the at least one peripheral device based on the robot system control process.

Other embodiments of the invention include additional method steps, such as a step of operating the robot system by executing the robot system control process on the robot controller, a step of storing the test sequence of device states in a memory, a step of graphically displaying the test sequence of device states, monitoring inputs of the at least one peripheral device to the plurality of peripheral ports, a step of initiating an analysis mode, or any combination thereof. Further, note that embodiments of the invention are not restricted to a particular sequence of performing method steps, and that steps may be performed partially of fully simultaneously.

FIG. 5 illustrates a robot system 100 comprising several peripheral devices 330*a*, 330*b*,330*c* according to an embodiment of the invention.

The illustrated embodiment has several features which are similar to the features of the embodiment illustrated in FIG. 3. But in contrast, the embodiment illustrated in FIG. 5 comprises several peripheral devices 330*a*,330*b*,330*c*. Namely, a first peripheral device 330*a* which is connected to a first peripheral port 331*a*, a second peripheral device 330*b* which is connected to a second peripheral port 331*b*, and a third peripheral device 330*c* which is connected to a third peripheral port 331*c*. The first peripheral port 331*a*, the second peripheral port 331*b*, and the third peripheral port 331*c* are part of a plurality of peripheral ports 331*a*, 331*b*, 331*c*.

In addition, this embodiment comprises a pre-filtering block 437 after the plurality of peripheral ports.

To configure the robot system control process 334 of the robot system 100, the peripheral devices 330*a*,330*b*,330*c* are interactively engaged to establish a test sequence 332 of device states based on inputs of the peripheral devices 330*a*, 330*b*,330*c* to the peripheral ports 331*a*,331*b*,331*c*. In this example, the test sequence 332 comprises three sub-sequences 435*a*,435*b*,435*c* of logic states, wherein each of these sub-sequences of device states is associated with one of the peripheral devices in the inputs of that peripheral device to the peripheral ports. Accordingly, the first peripheral device 330*a* is associated with a first sub-sequence 435*a*, a second peripheral device 330*b* is associated with a second sub-sequence 435*b*, and a third peripheral device is associated with a third sub-sequence 435*c*.

After recording the logic signals via interactive engagement, but prior to configuring the robot system control process via these signals, the recorded logic signals are provided to a pre-filtering block 437. Here, various filters may be applied to one or more of the signals. Such filters may for example remove noise, or convert the recorded signals into a format which is convenient for a human operator and/or the robot controller 110, which is advantageous. In other words, in embodiments of the invention, the method (of the invention) comprises a step of adapting the test sequence of device states to a configurable format by applying at least one filter to at least one of the device states of the test sequence. It is noted that the pre-filtering block 437 in some embodiments may be omitted.

The figure illustrates a pre-filtering block 437 between the plurality of peripheral ports and the test sequence 332 of device states, but filtering may in principle be applied anywhere, for example between a peripheral device and a peripheral port, for example via external circuitry.

Each of the sub-sequences 435*a*, 435*b*,435*c* comprises device states based on input from the peripheral device 330*a*,330*b*,330*c* associated with that sub-sequence. In this particular example, the first sub-sequence 435*a* comprises device states in form of logic states 333*a*, 333*b*, 333*c* corresponding to "low", "high", and "low", the second sub-sequence 435*b* comprises device states in form of logic states 333*d*,333*e* corresponding to "high" and "low", and the third sub-sequence 435*c* comprises device states in form of logic states 333*f*,333*g*,333*h* corresponding to "low", "high", and "low", but with different timing than the first sub-sequence 435*a*.

Based on this collection of device states from several peripheral devices, a robot system control process 334 can now be configured.

In the exemplary illustration, four different points in time, referred to as state timing selections 436*a-d*, are selected for implementation in the robot system control process 334, illustrated by four vertical dotted lines. The first state timing selection 436*a* corresponds to the device states of the sub-sequences 435*a*,435*b*,435*c* being "low", "high", and "low; the second state timing selection 436*b* corresponds to the device states of the sub-sequences being "high", "high", and "low"; the third state timing selection 436*c* corresponds to the device states of the sub-sequences being "low", "high", and "high"; and the fourth state timing selection 436*d* corresponds to the device states of the sub-sequences being "low", "low", and "low". These different combinations of device states 436*a-d* are thus implemented in the robot system control process 334, for example as conditions for particular operations of the robot arm 101. Note that the different combinations of device states are not restricted to a particular sequence of implementation in the robot system control process 334. For example, the third state timing selection 436*c* corresponding to the combination of device states of the sub-sequences being "low", "high", and "high" may be implemented first in the robot system control process 334.

After configuring the robot system control process 334 based on the device states of the test sequence 332, the robot system 100 can be operated according to that robot system control process 334.

Note that in this embodiment, the exemplified state timing selections 436*a-d* relate to the device states at particular times of the test sequence 332. Upon implementation of these selections into a robot system control process 334, the points in time at which the device states were recorded are not necessarily used in the robot system control process. In other words, in this embodiment, the device states of the test sequence implemented in the robot system control process are time independent. However, in other embodiments, the device states of the test sequence implemented in the robot system control process are time independent.

FIG. 6 illustrates a robot system 100 comprising a graphical user interface 647 with various tools 640-646 according to an embodiment of the invention.

The robot system 100 comprises a robot arm 101, a robot controller 110 configured to control operation of the robot arm 101, a plurality of peripheral ports 331*a*, 331*b*,331*c* integrated with the robot controller 110, and two peripheral devices 330*a*,330*b*. Each of the peripheral devices 330*a*, 330*b* is communicatively connected to a respective peripheral port of the plurality of peripheral ports 331*a*, 331*b*,331*c*. In other words, a first peripheral device 330*a* is communicatively connected to a first peripheral port 331*a*, and a second peripheral device 330*b* is communicatively connected to a second peripheral port 331*b*.

In addition, the robot system 100 comprises an interface device 111, which in turn comprises a graphical user interface 647. In this embodiment, the interface device 111 is a robot teach pendant, but in other embodiments, the interface device may for example be a tablet, a personal computer such as a laptop, or even a smartphone.

Via the graphical user interface 647, it is possible to configure a robot system control process 334 upon which the robot system 100 is operated. In this particular example, the graphical user interface 647 displays a robot system control process representation 648 in the form of a decision tree comprising robot system operational steps 649*a*-649*g* and operational conditions 650*a-c*.

Via the interface device 111, a human operator of the robot system 100 can initiate a programming mode distinct from the normal operational mode of the robot system, in which it performs a repetitive task according to a current robot system control process. In the programming mode, the robot system 100 halts its operation, and it is possible to configure the robot system control process via the interface device 111.

While the robot system is in programming mode, the human operator interactively engages with the two peripheral devices 330*a*,330*b*. Based on the resulting inputs of the peripheral devices 330*a*,330*b*, this establishes a test sequence 332 of device states, which is visualized on the graphical user interface 647 as digital waveform graph. The visualization comprises visualizations of the two sub-sequences 435*a*,435*b*, corresponding to the individual response of each of the individual peripheral devices 330*a*, 330*b*.

It is then possible for the user to assess the response of the peripheral devices individually, and to assess the collective or combined response of the group of peripheral devices.

Further, note that even though the embodiment comprises three peripheral ports 331*a*-331*c*, only digital waveform graphs from two of the peripheral ports are displayed. In practice, the inputs to the peripheral ports are monitored to identify input-receiving peripheral ports 331*a*,331*b*, and when graphically displaying the test sequence 332 in the graphical user interface, this is based exclusively on the inputs of the input receiving ports 331*a*, 331*b*.

In some embodiments, the graphical user interface 647 may provide additional information relating to the peripheral devices, and/or the peripheral ports to which they are connected. For example, the graphical user interface may display an identifier of a peripheral device and/or an identifier of a peripheral port of the plurality of peripheral ports in relation to each sub-sequence 435*a*,435*b*.

In some typical embodiments, the user can select a single device state of the test sequence 332 and configure the robot system control process 334 based on this device state. Such a selection may for example be performed by any conventional selection means of computer devices, such as a touch (e.g., if the interface device 111 comprises a touch screen), cursor (e.g. of a mouse), and/or keyboard.

In addition to this possibility, the interface device 111 of the robot system 100 in FIG. 6 further provides various configuration tools 640-646 which permits a human operator to perform various actions in relation to configuring the robot system control process 334 based on device states of the test sequence 332.

One of the tools is a state combination tool 640. This tool permits selection of several device states simultaneously, as indicated in FIG. 6 by a dotted line connecting the tool 640 to a section of the test sequence. Namely, in the illustrated example, the state combination tool 640 is used to select a device state in form of a "high" logic state from one sub-sequence 435*a* of the test sequence 332, and a device state in form of a "low" logic state from the other sub-sequence 435*b*. This combination of states may then, for example, be used as a condition in the robot system control process 334. Generally, such combination of states may be implemented in combination with Boolean operations such as an AND operator, an OR operator, a NOT operator, and an XOR operator. For example, two "high" device states may be implemented as an operational condition in the robot system control process 334 with an OR operator. Accordingly, this operational condition is then fulfilled if just one of the two relevant device states are "high". Note that even though the illustrated example indicates that the state combination tool 640 selects two device states which correspond to the same point in time, the tool 640 can optionally select device states corresponding to different points in time as well.

Another one of the tools is a state duration tool 641. This tool permits selection of a duration of a device state, as indicated in FIG. 6 by a dotted line connecting the tool 641 to a section of a sub-sequence 435*b* of the test sequence 332. Namely, in the illustrated example, the state duration tool 641 is used to select a device state in form of a "high" logic state from the sub section to which it is visually connected by the dotted line. The duration in which this logic state is "high" may then, for example, be used in the robot system control process as, e.g., a condition. Such a duration of a device state may generally be implemented with supplementary elements which specify durations intervals. Examples of such supplementary elements are "at least" and "at most", and correspondingly, duration intervals may be both open or closed intervals. Further, the duration or duration interval is typically manually adjustable. For example, if the interactive engagement results in a logic state being "high" for 1.5 seconds, the user can select this logic state with the state duration tool 641, and configure the robot system control process 334 by implementing an operational condition that the relevant logic state should be "high" in at least 1.0 second.

Another one of the tools is a state sequence tool 642. This tool permits selection of a sequence of device states, as indicated in FIG. 6 by a dotted line connecting the tool 642 to a section of a sub-sequence 435*b* of the test sequence 332. In the illustrated example, the state sequence tool 642 is used to select a sequence of device states corresponding to a sequence of logic states with the following states: "low", followed by "high", followed by "low". Even through the example shows the state sequence tool 642 being used to select a sequence of device states from a single sub-sequence, the state sequence tool is in typical embodiment capable of selecting sequences of states across several sub-sequences.

Another one of the tools is an end state tool 643. This tool permits selection of the combination of device states which the sub-sequences 435*a*,435*b* collectively have at the end time of the test sequence 332. This is also indicated in FIG. 6 by a dotted line connecting the tool 643 to the section of the test sequence 332 corresponding to the ends of the sub-sequences. In the illustrated example, the device states of the end time of the test sequence of logic sates is "low" and "low". The device states at the end time of the test sequence 332 as selected by the end state tool 643 may then be used to configure the robot system control process.

Another one of the tools is a state adjustment tool 644. This tool permits the user to adjust the device states of the test sequence 332. Accordingly, the test sequence 332 of device states established by interactively engaging with one or more peripheral devices may serve as a starting point for additional manual adjustments of these states. For example, a part of a "high" state may partially or fully be adjusted to be a "low" state, or a part of a "low" state may partially or fully be adjusted to be a "high" state. Such manual adjustments to the device states of the test sequence 332 can then be implemented prior to actually selecting device states upon which the robot system control process is configured. Accordingly, the test sequence can be tailored to provide the exact characteristics which the human operator desires.

Another one of the tools is a signal edge tool 645. This tool permits the user to select a signal edge of the device states of the test sequence 332, as indicated in FIG. 6 by a dotted line connecting the tool 645 to a section of a sub-sequence 435*a* corresponding to a falling signal edge between a "high" and a "low" logic signal. Such a digital signal edge may then be used to configure the robot system control process 334. A signal edge may be implemented with additional conditions such as "rising", "falling", or "rising/falling" (toggled), which indicate what type of signal edge upon which the robot system control process should act.

Another one of the tools is a state establishment tool 646. This tool permits the user to establish an additional sub-sequence of device states to the test sequence 332 of device states. This could for example be relevant if a third peripheral device is to be connected to a peripheral port 331*c* of the plurality of peripheral ports. When such a sub-sequence is added via the state establishment tool 646, the test sequence may thus comprise both one or more sub-sequences established by interactively engaging the peripheral devices, and one or more sub-sequences post-added via the state establishment tool 646. The user may then adjust this post-added sub-sequence to have any desirable waveform of "high" and "low" device states.

Optionally, embodiments of the invention may further comprise other types of tools, such as filtering tools which may be applied to the device states of the test sequence. For example, filtering based on hysteresis may be applied to compensate for electrical contact bounce. Further, tools for decoding signals, such as a serial HEX decoder may optionally be implemented. A robot system control process may then be configured based on such a decoded signal.

In general, embodiments of the invention may comprise any combination of the above-described configuration tools 640-646. Further, the configuration tools may be implemented into a programming environment for configuring the robot system control process, for example via conventional means for implementing functionalities in programming environments as well-known for the person skilled in the art. Note further that, in embodiments of the invention, each of the configuration tools 640-646 may be implemented individually. For example, one embodiment may have just the state sequence tool, whereas another embodiment has just the state combination tool, whereas another embodiment has the end state tool end the state establishment tool.

In this embodiment, the graphical user interface 647 displays a robot system control process representations 648 having robot system operational steps 649*a-g* and operational conditions 649*a-c*. Such elements are one example of elements of a robot system control process 334, but note that embodiments of the invention are not restricted to this example, and may involve any elements of robot system control processes known to the person skilled in the art.

In the illustrated example, the robot system control process 334 and its representation 648 has been configured based on device states of the test sequence and may thus be used to operate the robot system 100 accordingly. The robot system control process is initiated by a first operational step 649*a* which is followed by a first operational condition 650*a*. Based on the conditions detected by peripheral devices when the control process reaches this operational condition 650*a*, the control process will either proceed to a second operational step 649*b* or a third operational step 649*c* of the robot system. The second step 649*b* is followed by a second operational condition 650*b*. At the second operational condition 650*b*, the robot system control process pauses operation of the robot system 100 until the conditions specified by the second operational conditions are met, upon which the robot system control process proceeds to the fourth operational step 649*d*. When the fourth operational step 649*d* has been performed, the robot system control process 334 begins again at the first operational step 649*a*. The third step 649*c* is followed by a fifth operational step 649*e*, which in turn is followed by third operational condition 650*c*. Based on the conditions when the control process reaches this operational condition 650*c*, the control process will either proceed to a sixth operational step 649*f* or a seventh operational step 649*g*. When the sixth operational step 649*f* has been performed, the robot system control process 334 begins again at the first operational step 649*a*. When the seventh operational step 649*g* has been performed, the robot system control process 334 terminates operation of the robot system 100.

The three operational conditions 650*a-c* are implemented based on device states of the test sequence 332. And the test sequence is at least partially established by interactively engaging the peripheral devices 330*a*,330*b*.

Note that embodiments of the invention are not restricted to the particular type of visualization depicted in FIG. 6. Other embodiments may for example, additionally or alternatively, display lines of program code as a robot system control process representation 648.

FIG. 7 illustrates method steps S10-S50 according to another embodiment of the invention.

The illustrated method is a method for configuring a robot system (100), wherein the robot system (100) comprises a robot arm (101) and a robot controller (110) configured to control operation of the robot arm (101), wherein the method comprises the steps of:

- communicatively connecting (S10) each of at least one peripheral device (330) to a respective peripheral port of a plurality of peripheral ports (331) of the robot system;
- establishing (S20) a test sequence of device states by:
  - interactively engaging (S21) the at least one peripheral device (330); and
  - while interactively engaging the at least one peripheral device, recording (S22) inputs of the at least one peripheral device (330) to the plurality of peripheral ports (331);
- visualizing (S30) the test sequence of device states on a display; and
- configuring (S40) a robot system control process (334) of the robot system (100) based on the test sequence (332) by interacting (S41) with the visualization of the test sequence.

In this embodiment, the test sequence of device states may thus be established by synchronously interactively engaging the at least one peripheral device and recording inputs of the at least one peripheral device to the plurality of peripheral ports. The test sequence of device states may typically be the resulting recording of these inputs of the at least one peripheral device, or a representation thereof. Optionally, the recording may be performed by the robot controller, for instance in examples in which the plurality of peripheral ports are integrated in the robot controller.

The display upon which the test sequence of device states is visualized may for example be a graphical user interface, such as a graphical user face of a personal computer, tablet, or teach pendant of the robot system.

The visualization may typically comprise one or more digital waveform graph representing the test sequence of device states, but embodiments of the invention are not limited to any particular type of visualization. Generally, a visualization of the of the test sequence of device states may both provide a quick overview for the user, as well as a convenient platform for configuration of the robot system control process, which is advantageous.

The interaction with the visualization upon which the robot system control process is configured may for example be performed by any conventional selection means of computer devices, such as a touch on the display, a computer cursor, and/or a keyboard. Further, the interaction may be facilitated by configuration tools, such as those described in relation to FIG. 6.

The method may comprise the following optional step illustrated in FIG. 7 by dotted lines:

- executing (S50) the robot system control process.

And optionally the step of interacting (S41) with the visualization of the test sequence may comprise any combination of one or more of the following steps:

- selecting (S41*a*) a duration of a device state of the test sequence.
- selecting (S41*b*) a sequence of a device state of the test sequence.
- selecting (S41*c*) a state of a device state at a selected time of the test sequence.
- adjusting (S41*d*) a state of a device state at a selected time of the test sequence.
- selecting (s41*e*) a signal edge of the device states of the test sequence.
- establishing (S41*f*) an additional sub-sequence of a device sates of the test sequence, wherein the step of establishing the sub-sequence of a device states optionally comprises the steps of:
  - interactively engaging at least one additional peripheral device and while interactively engaging the at least one additional peripheral device recording inputs from a peripheral port to which the additional peripheral device is connected.

In an embodiment where a plurality of peripheral devices have been connected to respective peripheral ports of the plurality of peripheral ports of the robot system and where the test sequence of device states have been established by interactively engaging the plurality of peripheral devices and recording inputs of the at plurality of peripheral device to the plurality of peripheral ports, the step of interacting (S41) with the visualization of the test sequence may optionally comprise a step of selecting (S41*g*) a combination of device states, as also indicated in FIG. 7 by a dotted line.

From the above, it is now clear that the invention relates to a robot system and a method for configuring a robot system. One particular aspect of the invention relates to utilizing interactive engagement with peripheral devices as an active step during configuring/programming the robot system. By utilizing such interactions, and their resulting output of device states, configuration of robot systems may be significantly simplified for both robot professionals and non-professionals. This is achieved as the human operator of the robot system can initiate a demonstration of the device states by interactive engaging the peripheral devices, the human operator can thus show how the robot system is intended to operate.

The invention has been exemplified above with the purpose of illustration rather than limitation with reference to specific examples of methods and robot systems. Details such as a specific method and system structures have been provided in order to understand embodiments of the invention. Note that detailed descriptions of well-known systems, devices, circuits, and methods have been omitted so as to not obscure the description of the invention with unnecessary details. It should be understood that the invention is not limited to the particular examples described above and a person skilled in the art can also implement the invention in other embodiments without these specific details. As such, the invention may be designed and altered in a multitude of varieties within the scope of the invention as specified in the claims.

LIST OF REFERENCE SIGNS

100 robot system
101 robot arm
102 robot joint
103 robot base
104 robot tool flange
105 axis of robot joints
106 rotation arrow of robot joints
107 robot tool flange reference point
108 robot base reference point
109 direction of gravity
110 robot controller
111 interface device
112 display
113 input devices
114 force torque sensor
115 acceleration sensor
216 output flange
217 joint motors
218 output axle
219 joint sensor
220 joint sensor signal
221 memory
222 processor
223 motor control signals
224 force signal
225 accelerations signal
330 peripheral device
331 peripheral port
332 test sequence
333 device states
334 robot system control process
435 sub-sequence
436 state timing selection
437 pre-filtering block
640 state combination tool
641 state duration tool
642 state sequence tool
643 end state tool
644 state adjustment tool
645 signal edge tool
646 state establishment tool
647 graphical user interface
648 robot system control process representation
649 robot system operational step
650 operational condition
S1-S3 method steps
S10-S50 method steps

The invention claimed is:

1. A method for configuring a system comprising an arm and a controller configured to operate the arm, the method comprising:

establishing a communication connection between a peripheral device and a peripheral port of a plurality of peripheral ports of the system;

establishing a test sequence of device states based on inputs of the peripheral device to the peripheral port, where the test sequence of device states comprises a time series of the device states;

monitoring the plurality of peripheral ports to identify an input-receiving peripheral port of the plurality of peripheral ports, where the monitoring comprises listening for the inputs on the plurality of peripheral ports and determining through which of the plurality of ports the inputs are received; and configuring a system control process of the system based on the test sequence of device states and identification of the input-receiving peripheral port, where at least a subset of the time series of the device states is used in configuring the system control process.

2. The method of claim 1, further comprising:

executing the system control process on the controller to operate the arm.

3. The method of claim 2, further comprising:

waiting for the inputs from the peripheral device before executing at least a part of the system control process.

4. The method of claim 1, wherein the system is in a non-operational state during the configuring of the system control process.

5. The method of claim 1, wherein the system control process is based on operation of the peripheral device.

6. The method of claim 1, wherein operation of the peripheral device is based on communication through the peripheral port.

7. The method of claim 1, wherein establishing the test sequence of device states is based on manual engagement with the peripheral device.

8. The method of claim 1, further comprising:

graphically displaying the test sequence of device states using a graphical user interface.

9. The method of claim 8, wherein configuring the system control process is performed using the graphical user interface; and wherein graphically displaying the test sequence of device states is based on input to the input-receiving peripheral port.

10. The method of claim 1, wherein the test sequence of device states comprises one or more digital signal edges; and wherein at least one of the one or more digital signal edges is used in configuring the system control process.

11. A method for configuring a system comprising an arm and a controller configured to operate the arm, the method comprising:

establishing a communication connection between a peripheral device and a peripheral port of a plurality of peripheral ports of the system;

establishing a test sequence of device states based on inputs of the peripheral device to the peripheral port;

monitoring the plurality of peripheral ports to identify an input-receiving peripheral port of the plurality of peripheral ports, where the monitoring comprises listening for the inputs on the plurality of peripheral ports and determining through which of the plurality of ports the inputs are received; and configuring a system control process of the system based on the test sequence of device states and identification of the input-receiving peripheral port;

wherein the test sequence of device states comprises a plurality of sub-sequences of the device states;

wherein each of the plurality of sub-sequences of the device states is based on input of the peripheral device to the peripheral port; and wherein configuring the system control process is based on at least two of the plurality of sub-sequences of the device states.

12. A method for configuring a system comprising an arm and a controller configured to operate the arm, the method comprising:

establishing a communication connection between a peripheral device and a peripheral port of a plurality of peripheral ports of the system;

establishing a test sequence of device states based on inputs of the peripheral device to the peripheral port;

monitoring the plurality of peripheral ports to identify an input-receiving peripheral port of the plurality of peripheral ports, where the monitoring comprises listening for the inputs on the plurality of peripheral ports and determining through which of the plurality of ports the inputs are received; and configuring a system control process of the system based on the test sequence of device states and identification of the input-receiving peripheral port;

wherein configuring the system control process comprises determining a selection of states from the test sequence of device states based on a graphical visualization of the test sequence of device states.

13. The method of claim 12, wherein the selection of the states comprises selection of at least two of a plurality of sub-sequences of the test sequence of device states.

14. The method of claim 13, wherein the test sequence of device states comprise one or more of: device states established at a plurality of different times, one or more device states at an end time of the test sequence of device states, a digital signal edge of the test sequence of device states, or a duration of one of the device states of the test sequence of device states.

15. The method of claim 12, wherein performing one or more operations of the system control process is based on the selection of the device states.

16. A method for configuring a system comprising an arm and a controller configured to operate the arm, the method comprising:

establishing a communication connection between a peripheral device and a peripheral port of a plurality of peripheral ports of the system;

establishing a test sequence of device states based on inputs of the peripheral device to the peripheral port;

monitoring the plurality of peripheral ports to identify an input-receiving peripheral port of the plurality of peripheral ports, where the monitoring comprises listening for the inputs on the plurality of peripheral ports and determining through which of the plurality of ports the inputs are received;

configuring a system control process of the system based on the test sequence of device states and identification of the input-receiving peripheral port; and performing one or more of the following operations:

selecting device states apart from the test sequence of device states prior to performing the system control process; or adjusting the device states in the test sequence of device states prior to performing the system control process.

17. The method of claim 1, wherein the method is performed for multiple peripheral devices and multiple peripheral ports of the plurality of peripheral ports; and wherein:

establishing a communication connection comprises establishing respective communication connections between respective peripheral devices and respective peripheral ports of the plurality of peripheral ports;

establishing a test sequence of device states comprises establishing respective test sequences of device states based on respective inputs of the respective peripheral devices to the respective peripheral ports;

monitoring the plurality of peripheral ports comprises monitoring the plurality of peripheral ports to identify respective input-receiving peripheral ports of the plurality of peripheral ports; and configuring the system control process is based on the respective test sequences of device states and identification of the respective input-receiving peripheral ports.

18. The method of claim 1, wherein the method further comprises:

initiating an analysis mode of the system;

wherein the analysis mode comprises automatically performing the monitoring.

19. The method of claim 18, wherein the analysis mode further comprises:

automatically graphically displaying the test sequence of device states; and automatically configuring the system control process.

20. A system comprising:

an arm;

a controller configured to operate the arm;

a plurality of peripheral ports; and a peripheral device communicatively connected to a peripheral port of the plurality of peripheral ports;

wherein the system is configured to perform operations comprising:

establishing a test sequence of device states based on inputs of the peripheral device to the peripheral port, where the test sequence of device states comprises a time series of the device states;

identifying the peripheral port as an input-receiving port of the plurality of peripheral ports, where the identifying comprises listening for the inputs on the plurality of peripheral ports and determining through which of the plurality of ports the inputs are received; and configuring a system control process of the system based on the test sequence of device states and identification of the peripheral port as the input-receiving port, where at least a subset of the time series of the device states is used in configuring the system control process.

21. The system of claim 20, wherein the controller is configured to operate the arm based on the system control process.

22. The system of claim 20, wherein:

the peripheral port comprises a physical socket for a physical plug of a cable of the peripheral device; or the peripheral port comprises a wireless communication device configured to wirelessly communicate with the peripheral device.

23. The system of claim 20, wherein the system comprises a graphical user interface configured to display the test sequence of device states, and wherein the system control process is configurable through the graphical user interface.

24. The system of claim 20, wherein the peripheral device comprises at least one of a sensor, a user input mechanism, an auxiliary robot, automation equipment, a processing apparatus, a computing device, or a camera.

25. The system of claim 20, wherein the system is configured to perform operations to record the test sequence of device states; and wherein the system comprises digital storage to store the test sequence of device states.

26. The system of claim 20, wherein the system control process comprises an arm control process and a peripheral device control process;

wherein the controller is configured to operate the arm based on the arm control process;

wherein the controller is configured to operate the peripheral device based on the peripheral device control process; and wherein operation of the system according to the system control process comprises communication between the arm control process and the peripheral device control process.

27. The system of claim 20, wherein at least one of the device states of the test sequence of device states comprises an operation in the system control process.

28. The system of claim 26, wherein the communication between the arm control process and the peripheral device control process comprises the operation.

29. The system of claim 20, wherein the system is configured to be set in an analysis mode, where the system in the analysis mode is configured to monitor inputs of the peripheral device to the peripheral port while the peripheral device is engaged with the peripheral port.

* * * * *